United States Patent
Ramirez

(10) Patent No.: US 9,643,140 B2
(45) Date of Patent: May 9, 2017

(54) LOW ENERGY MICROBUBBLE GENERATION SYSTEM AND APPARATUS

(71) Applicant: MikroFlot Technologies LLC, Milwaukee, WI (US)

(72) Inventor: Jose Antonio Ramirez, Vernon Hills, IL (US)

(73) Assignee: MikroFlot Technologies LLC, Milwaukee, WI (US)

( * ) Notice: Subject to any disclaimer, the term of this patent is extended or adjusted under 35 U.S.C. 154(b) by 189 days.

(21) Appl. No.: 14/719,882

(22) Filed: May 22, 2015

(65) Prior Publication Data

US 2015/0336112 A1    Nov. 26, 2015

Related U.S. Application Data

(60) Provisional application No. 62/002,044, filed on May 22, 2014, provisional application No. 62/030,339, filed on Jul. 29, 2014.

(51) Int. Cl.
*B01F 3/04* (2006.01)
*B01F 11/02* (2006.01)
(Continued)

(52) U.S. Cl.
CPC .......... *B01F 11/02* (2013.01); *B01F 3/04248* (2013.01); *B01F 15/024* (2013.01);
(Continued)

(58) Field of Classification Search
CPC .... B01F 3/04248; B01F 11/02; B01F 15/024; B03D 1/028; B03D 1/24; C02F 1/24; C02F 2303/26
(Continued)

(56) References Cited

U.S. PATENT DOCUMENTS

| 835,120 A | 11/1906 | Sulman et al. |
| 3,992,491 A | 11/1976 | Ihrig et al. |
| (Continued) | | |

FOREIGN PATENT DOCUMENTS

| DE | 2514197 | 10/1976 |
| DE | 3543022 | 8/1987 |
| (Continued) | | |

OTHER PUBLICATIONS

Bruggeman et al., Flow Induced Pulsations in Pipe Systems (1987).

(Continued)

*Primary Examiner* — Charles Bushey
(74) *Attorney, Agent, or Firm* — Michael Best & Friedrich LLP

(57) ABSTRACT

A bubble generation system includes a gaseous pressure source supplying a gas flow and a wave inducer including a first inlet in fluid communication with the gaseous pressure source to receive the gas flow and a first outlet. The wave inducer transitions the gas flow into a pulsating acoustic wave that exits the wave inducer through the outlet. The bubble generation system also includes a diffuser fluidly coupled to the outlet of the wave inducer. The diffuser is configured to produce bubbles from the gaseous pressure source. The bubble generation system further includes a vent passageway fluidly coupled between the wave inducer and the diffuser. The vent passageway is configured to be in fluid communication with an ambient environment.

20 Claims, 12 Drawing Sheets

(51) Int. Cl.
*B01F 15/02* (2006.01)
*B03D 1/02* (2006.01)
*B03D 1/24* (2006.01)
*C02F 1/24* (2006.01)

(52) U.S. Cl.
CPC ............ *B03D 1/028* (2013.01); *B03D 1/24* (2013.01); *C02F 1/24* (2013.01); *C02F 2303/26* (2013.01)

(58) Field of Classification Search
USPC .......................................... 261/30, 81, 122.1
See application file for complete search history.

(56) References Cited

U.S. PATENT DOCUMENTS

| | | | |
|---|---|---|---|
| 4,022,854 | A | 5/1977 | Kyrias |
| 4,041,984 | A | 8/1977 | Morel |
| 4,226,705 | A | 10/1980 | Lecoffre |
| 4,793,714 | A | 12/1988 | Gruber |
| 4,981,582 | A | 1/1991 | Yoon et al. |
| 5,087,292 | A | 2/1992 | Garrido |
| 6,039,309 | A | 3/2000 | Kuklinski |
| 6,196,525 | B1 | 3/2001 | Gañnan-Càlvo |
| 6,572,084 | B1 * | 6/2003 | Ivanovich ........... B01F 3/04446 261/122.1 |
| 7,377,685 | B2 * | 5/2008 | Breithaupt ................ B01F 3/08 366/152.2 |
| 8,287,175 | B2 | 10/2012 | Zimmerman et al. |
| 8,402,895 | B2 | 3/2013 | Dupont et al. |
| 8,734,727 | B2 | 5/2014 | Zimmerman et al. |
| 2005/0098497 | A1 * | 5/2005 | Khudenko ......... B01D 19/0031 210/620 |
| 2011/0209684 | A1 | 9/2011 | Veinblat et al. |
| 2012/0168972 | A1 * | 7/2012 | Norris .................. G01V 1/3808 261/105 |
| 2013/0092626 | A1 | 4/2013 | Zimmerman et al. |
| 2013/0099398 | A1 | 4/2013 | Takase et al. |
| 2013/0099401 | A1 | 4/2013 | Amano et al. |
| 2014/0083845 | A1 | 3/2014 | Han et al. |

FOREIGN PATENT DOCUMENTS

| | | |
|---|---|---|
| DE | 4405961 | 8/1995 |
| EP | 0135822 | 4/1985 |
| EP | 2735362 | 5/2014 |
| GB | 1268426 | 3/1972 |
| GB | 2273700 | 6/1994 |
| JP | 57-171414 | 10/1982 |
| JP | 2006-087984 | 4/2006 |
| JP | 2009-082923 | 4/2009 |
| KR | 101251899 | 4/2013 |
| SU | 1344420 | 10/1987 |
| SU | 1616561 | 12/1990 |
| WO | 94/13394 | 6/1994 |
| WO | 99/30812 | 6/1999 |
| WO | 2008/147050 | 12/2008 |
| WO | 2014/060740 | 4/2014 |

OTHER PUBLICATIONS

Buyevich, Y. A. and B. W. Webbon (1996) Bubble formation at a submerged orifice in reduced gravity, Chem Eng. Sci., 51(4), 4843-4857.
Di Marco, P., Grassi, W., Memoli, G., Takamasa, T., Tomiyama, A. and S. Hosokawa, (2003) Influence of electric field on single gas-bubble growth and detachment in microgravity, Int. J. Multiphase Flow, 29, 559-578.
Tonon et al., Self-Sustained Aeroacoustic Oscillations in Multiple Side Branch Pipe Systems (2009).
Hanotu et al., "Oil emulsion separation with fluidic oscillator generated microbubbles," International Journal of Multiphase Flow, 2013, vol. 56, pp. 119-125.
Healy et al., "A Review of Electrokinetic Studies of Metal Sulphides," Flotation, A.M. Gaudin Memorial Volume, 1976, Chapter 9, pp. 275-297.
International Search Report and Written Opinion for Application No. PCT/US2015/033239 dated Aug. 18, 2015 (12 pages).
Luyken W. and E Bierbrauer, "Die Theorie der Flotation, veranschaulicht an einem einfachen Flotationsmodell," Die Flotation in Theorie and Praxis, Springer, 1931, pp. 33-43.
Shirota, M., Sanada, T., Sato, A. and M. Watanabe (2008) Formation of submillimeter bubble from an orifice using pulsed acoustic pressure waves in gas phase, Phys. Fluids, 20, 043301.
Ramirez, J. A., Zinchenko, A., Loewenberg, M. and R.H. Davis, 1999, The Flotation rates of fine spherical particles under Brownian and convective motion, Chem Eng. Sci., 54, 149-157.
Rowley et al., "On Self-Sustained Oscillations in Two-Dimensional Compressible Flow Over Rectangular Cavities," J. Fluid Mech., 2002, vol. 455, pp. 315-346.
International Preliminary Report on Patentability for Application No. PCT/US2015/033239 dated Aug. 12, 2016 (17 pages).

* cited by examiner

LOW ENERGY MICROBUBBLE GENERATION SYSTEM AND APPARATUS

CROSS-REFERENCE TO RELATED APPLICATIONS

This application claims priority to U.S. Provisional Patent Application No. 62/002,044 filed May 22, 2014, and U.S. Provisional Patent Application No. 62/030,339 filed Jul. 29, 2014, the entire contents of all of which are incorporated herein by reference.

FIELD OF THE INVENTION

The present invention relates to microbubble generation, and more particularly to microbubble generation within a flotation system.

SUMMARY

Embodiments of the invention provide systems and methods of generating very small bubbles in a flowing or contained liquid that are simple and easy to manufacture, install, and operate and that consume minimal or no electrical power.

In one embodiment, the invention provides a bubble generation system. The bubble generation system includes a gaseous pressure source supplying a gas flow and a wave inducer including a first inlet in fluid communication with the gaseous pressure source to receive the gas flow and a first outlet. The wave inducer transitions the gas flow into a pulsating acoustic wave that exits the wave inducer through the outlet. The bubble generation system also includes a diffuser fluidly coupled to the outlet of the wave inducer. The diffuser is configured to produce bubbles from the gaseous pressure source. The bubble generation system further includes a vent passageway fluidly coupled between the wave inducer and the diffuser. The vent passageway is configured to be in fluid communication with an ambient environment.

In another embodiment, the invention provides a method of generating microbubbles. The method includes coupling a first wave inducer fluidly between a gaseous pressure source and a diffuser, receiving a supply of gas flow from the gaseous pressure source at an inlet of the wave inducer, transitioning the gas flow into a pulsating gas flow, discharging a portion of the pulsating gas flow to an ambient environment, receiving the pulsating gas flow by the diffuser, and generating microbubbles from the pulsating gas flow through the diffuser.

Other features and aspects of the invention will become apparent by consideration of the following detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
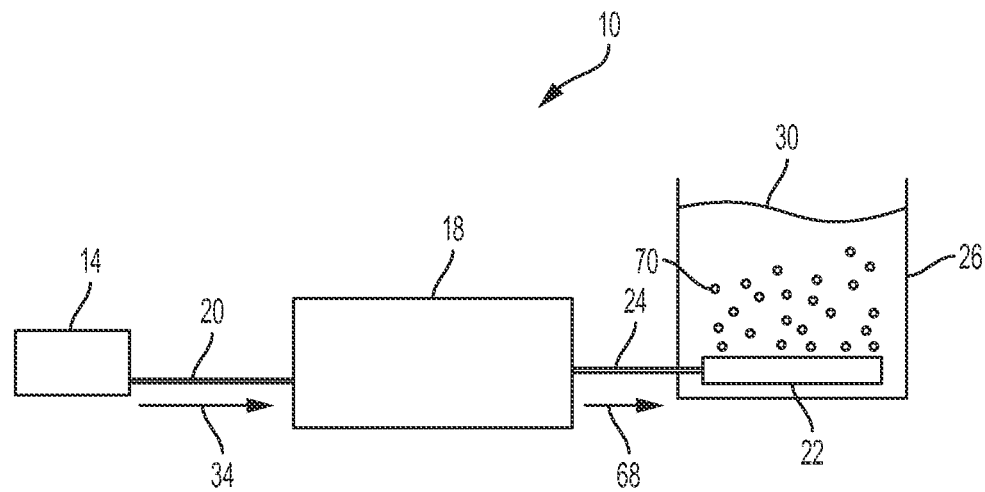
FIG. 1 illustrates a bubble generation system including a gaseous pressure source, a wave inducer, and a diffuser according to one embodiment of the invention.

FIG. 1 illustrates a microbubble generation system 10 including a gaseous pressure source 14 fluidly coupled to a wave inducer 18 via an inlet conduit 20, and the wave inducer 18 fluidly coupled to a diffuser 22 via an outlet conduit 24. In the illustrated embodiment, the diffuser 22 is located within a reservoir 26 that contains a liquid 30 (e.g., wastewater) that includes impurities. Although the system 10 is described as having the diffuser 22 in the reservoir 26, the diffuser 22 may be placed in a container through which the liquid 30 is flowing. For example, with respect to FIG. 1, the reservoir 26 illustration may be viewed as a cross-section of a channel through which the liquid is flowing (i.e., in a direction in or out of the page).

The microbubble generation system 10 is used for flotation, in the illustrated example. In essence, flotation is a technique used to separate impurities (e.g., finely suspended particles or droplets) from a liquid within a volume (e.g., a reservoir, a channel, a pipe, etc.). The liquid including the impurities may be in a generally static state within the reservoir, periodically or continuously filled and/or drained from the reservoir, or may be in a generally flowing state passing through the channel, pipes, etc. Flotation includes a release of small gas bubbles (e.g., less than about 2 millimeters in diameter) within the liquid. As the small gas bubbles float to the surface of the liquid, the small gas bubbles encounter and interact with the impurities suspended within the liquid. Consequently, the rising gas bubbles collide with the impurities, and then carry the impurities to the surface of the liquid for extraction and removal (e.g., via skimming).

A consideration in flotation is the relative sizes of the bubbles and suspended particles to be separated. If the bubble size is too large relative to the particles, the particles will tend to flow around the rising bubble due to their small inertia being unable to overcome the hydrodynamic resistance between the particles and the large bubble to result in a collision. As an example, bubbles having a diameter of several millimeters attempting to attach to particles of less than about 5 micrometers will have a lower separation efficiency. However, for smaller bubbles (e.g., less than about 100 micrometers in diameter), the relative inertia between the bubble and the impurities is much lower, and thus the probability of bubble-impurity attachment is higher, resulting in higher separation efficiencies.

Aside from gravity, the Brownian effect is another force that is inversely proportional to the size of the impurity. The Brownian effect is the random motion of the impurities from atomic interactions between atoms or molecules of the liquid with the impurities. For very fine impurities, Brownian effect can overcome the fluid streamlines to cause the impurities to collide with the bubble. However, the fluid streamlines have to be weak and the contact duration between bubble and impurity needs to be substantial. A substantial contact duration happens with smaller bubbles due to their smaller rising velocity to the surface of the liquid.

Returning to FIG. 1, the gaseous pressure source 14 is located upstream from the wave inducer 18 and supplies the wave inducer 18 with an incoming steady gas flow 34 (FIG. 2C) via the inlet conduit 20. In the illustrated embodiment, the incoming steady gas flow 34 is air. In other embodiments, the incoming steady gas flow 34 is another gas type, such as carbon dioxide, natural gas, oxygen or nitrogen. The incoming steady gas flow 34 includes properties of velocity, static gas supply pressure, Reynolds number, and Mach number. For example, the velocity can range from about 1 meter per second (m/s) to about 100 m/s, the static gas supply pressure can range from about 10 pounds per square inch gauge (psig) to about 150 psig, the Reynolds number can range from about 1000 to about $10^6$, and the Mach number can range from about 0.001 to about 0.5.

Figure 2A:
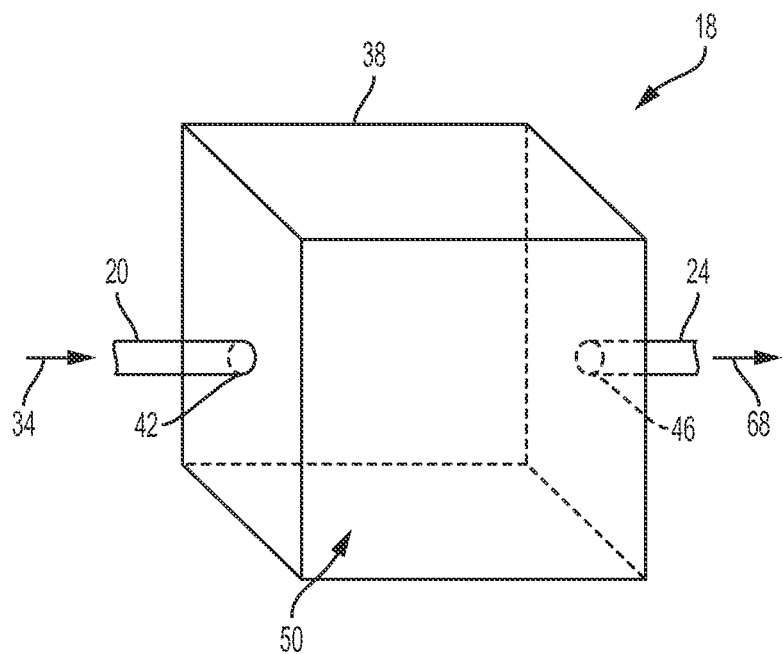
FIG. 2A illustrates a portion of the bubble generation system of FIG. 1 including the wave inducer.
Figure 2B:
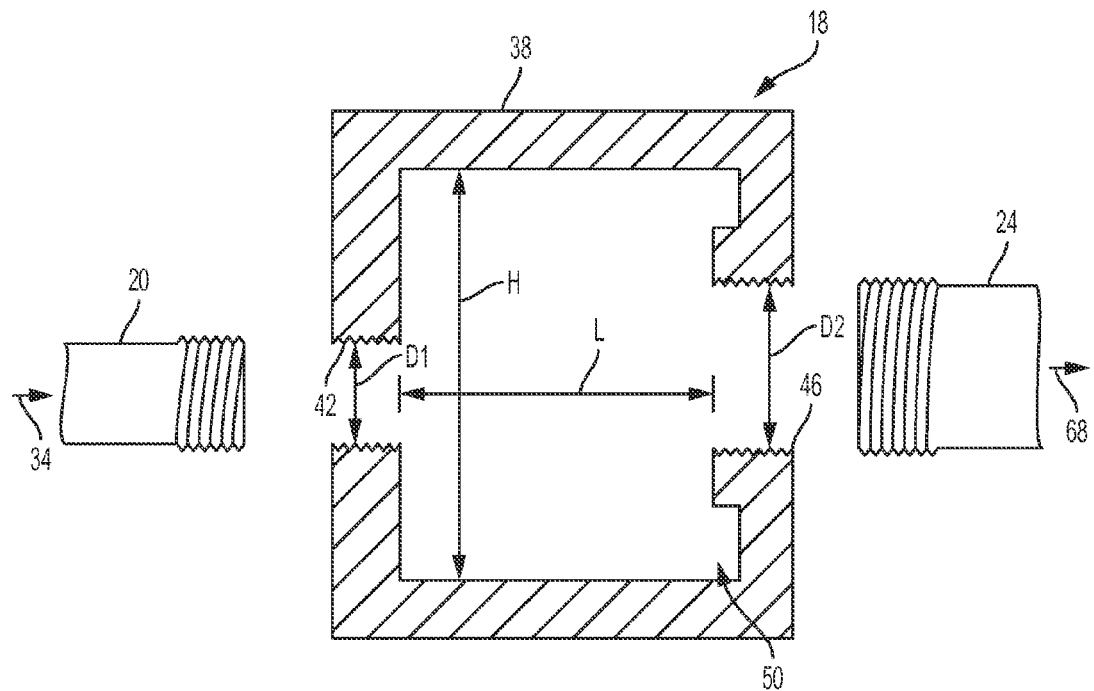
FIG. 2B illustrates an exploded cross sectional view of the wave inducer of FIG. 2A.
Figure 2C:
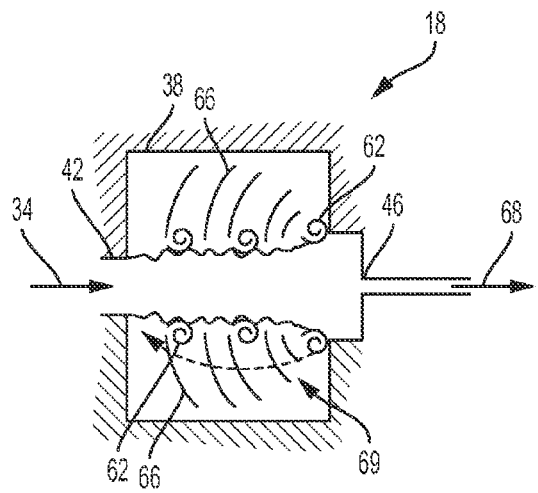
FIG. 2C illustrates a gas flow traveling through the wave inducer of FIG. 2A.

FIGS. 2A-C illustrate the wave inducer 18, which is, for instance, a vortical resonating chamber that induces waves in a gas flow. As described in detail below, the induced waves result in smaller bubbles being generated by the diffuser 22. As shown in FIG. 2A, a housing 38 is generally in a cuboid shape. In other embodiments, the housing 38 takes the form of another shape, such as a cylinder, pyramid, or another shape defining a volume. The housing 38 includes an inlet 42 coupled to the pressure source 14 and an outlet 46 coupled to the bubble diffuser 22. In the illustrated embodiment, the wave inducer 18 is of a polymer composition that can withstand the pressures supplied by the pressure source 14. However, the wave inducer 18 is of a metal composition or other material composition in other embodiments.

FIG. 2B illustrates a cross sectional view of the wave inducer 18 that is defined by the housing 38. As illustrated, the inlet 42 and the outlet 46 are threaded openings for receiving the inlet conduit 20 and the outlet conduit 24, respectively. Although the conduits 20, 24 are illustrated as having threaded couplers, in some instances, other fluid-sealing coupling mechanisms are used (e.g., quick-disconnect, interference fit, snap fit). In the illustrated embodiment, the inlet 42 includes a diameter D1, and the outlet 46 includes a diameter D2 wherein the inlet 42 and the outlet 46 are axially aligned. The inlet diameter D1 can range from about 0.125 of an inch to about 1.5 inches. The outlet diameter can range from about 0.125 of an inch to about 4 inches. Although D2 is shown larger than D1 in FIG. 2B, in some instances, D2 is the same or less than D1. In addition, the wave inducer 18 is defined by a cavity 50 fluidly coupling the inlet 42 and the outlet 46. The cavity 50 is a substantially open volume within the wave inducer 18 that is defined by a length L and a height H. The cavity length L can range from about 1 inch to about 15 inches, and the cavity height H can range from 1 inch to about 10 inches. In other embodiments, the inlet 42 and the outlet 46 may be radially offset, rather than axially aligned.

FIGS. 3A-D illustrate a cross sectional portion of the bubble diffuser 22. The diffuser 22 is a porous material or screen (e.g., ceramic, metallic) that is submerged in the liquid 30. The diffuser 22 includes a surface 54 that is generally facing upwardly within the reservoir 26. The surface 54 includes a plurality of apertures 58 (one is shown), which are formed by the natural properties of the porous material and which are arranged sporadically on the surface 54. In other embodiments, the surface 54 is a solid material with the apertures 58 machined in a regular pattern or sporadically on the surface 54.

In operation and in reference to FIG. 2C, the pressure source 14 provides the incoming steady gas flow 34 to the inlet 42 of the wave inducer 18. As the incoming steady gas flow 34 exits the inlet 42, detachment of the boundary layer formed at the walls of the inlet 42 produces vortex-ring flow patterns 62 that are convected downstream. As these vortices collide with the edge of the outlet 46, acoustic waves 66 are generated and travel upstream to enhance vortice-ring flow generation by facilitating boundary layer detachment. By way of reference, the gas flow between the inlet 42 and the outlet 46 of the wave inducer 18 can be characterized as a transitioning gas flow 69.

In addition, the frequency of the acoustic waves 66 are proportional to the wavelength of the vortex-ring flow patterns 62 and to the velocity with which the vortex-ring flow patterns 62 impinge on the edges of the outlet 46. The frequency of the acoustic waves 66 may be manipulated to a desired frequency by varying the length L of the cavity 50 or by varying the velocity of the incoming steady gas flow 34 entering the inlet 42.

The cavity 50 acts as a simple harmonic oscillator with its characteristic natural frequency. The wave inducer 18 is only slightly damped, and thus, the cavity 50 will strongly magnify the acoustic disturbances generated within. As a result, the vortex-ring flow patterns 62, also referred to as periodic vortices, become in phase with the acoustic waves 66. A periodic excitation force develops that sustains pressure oscillations that are transmitted through the wave inducer 18 to the diffuser 22 resulting in an outgoing pulsating gas flow 68.

As previously noted, the diffuser 22 includes a plurality of apertures 58 that release gas bubbles 70, which are illustrated, not to scale, in FIG. 1, into the reservoir 26 to remove impurities of the liquid 30. Embodiments described herein focus on the dynamic regime of gas flow, with flow rates that go from several cm³/s to about 10,000 cm³/s. In this range, bubble generation is governed by the relationship between inertial, viscous, surface tension and gravity (buoyancy) forces. The full force balance along the vertical axis on a bubble growing from gas flowing in a submerged orifice is:

$$\frac{d}{dt}\left[V_b\left(\rho_g + \frac{11}{16}\rho_l\right)\frac{ds}{dt}\right] = (\rho_l - \rho_g)V_b g - F_D - \pi a\sigma \sin\theta + \int_{A_o} \rho_g u_g^2 dA + \frac{\pi a^2}{4}(\rho_g - \rho_l) - \frac{\pi a^2}{4}\rho_l\left[r_b\frac{d^2 r_b}{dt^2} + \frac{3}{2}\left(\frac{dr_b}{dt}\right)^2\right]$$

where the left hand side represents the change in momentum due to mass inflow into the bubble, $V_b$ is the bubble volume at any given time, $p_g$ is the density of the gas and s represents the location of the center of the bubble with respect to the orifice plane. This force is balanced by the right hand side, that is the buoyancy force (1$^{st}$ term), the drag force on the growing bubble, $F_D$, the third term is the contact force along the 3-phase line due to interfacial tension (where θ is a time dependent contact angle), the fourth term is the momentum inflow through the orifice (with $A_o$, the orifice cross sectional area), the fifth term is the unbalance excess of inertial bubble pressure, $p_g$ vs. external hydrostatic pressure in the liquid, $p_l$; while the sixth and last term is the portion of the expansion force against the liquid which is unbalanced by bubble symmetry (this model assumes bubble remains spherical throughout). This expression depends on the time-dependent bubble radius, $r_b$.

With respect to the above equation, for the case of small orifices in relation to the bubble diameter, the contribution of the fourth, fifth and sixth terms will be overshadowed by the others. Similarly, for liquids of very low viscosity (like water), and gas flow rates as noted above, the drag force, $F_D$ will also be negligible.

Thus, the size of the resulting bubble will be determined by the balancing of the upward buoyancy force and the downwards interfacial tension and inertial forces. A closer examination of the inertial force, yields:

$$F_I = -\frac{4}{3}\pi\rho_l\left[\frac{11}{16}\right]\frac{d}{dt}\left(r_b^3\frac{ds}{dt}\right)$$

where the density of the gas has been neglected given $\rho_l \gg \rho_g$, and the volume of the spherical bubble has been written as a function of its radius, $r_b$. Expanding the time derivative terms yields, $$F_I = -\frac{4}{3}\pi\rho_l\left[\frac{11}{16}\right]\left(3r_b^2\frac{dr_b}{dt}\frac{ds}{dt} + r_b^3\frac{d^2 s}{dt^2}\right).$$

For small orifices, and assuming the upwards velocity of the (still attached) bubble $$\frac{ds}{dt},$$

to be constant or nearly constant, the second term on the right hand side is negligible. Thus, the inertial force can be defined as:

$$F_I \cong -\frac{4}{3}\pi\rho_l\left[\frac{11}{16}\right]\left(3r_b^2\frac{dr_b}{dt}\frac{ds}{dt}\right)$$

The inertial force acts in the opposite direction to the upwards velocity of the bubble, $$\frac{ds}{dt},$$

and its expanding boundary, $$\frac{dr_b}{dt}.$$

Microbubble generation according to embodiments of the invention take advantage of this relationship.

Figure 3A:
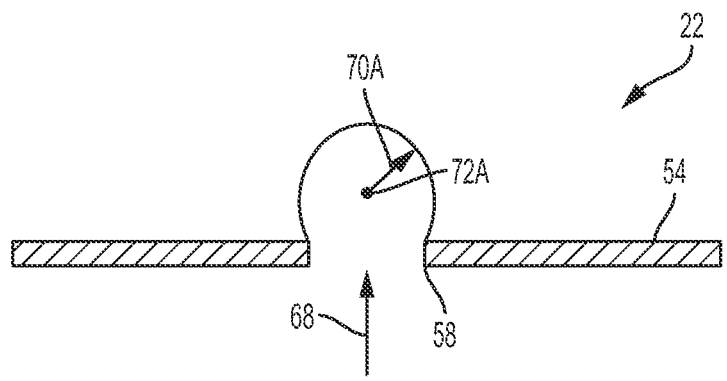
FIG. 3A illustrates a portion of the bubble generation system of FIG. 1 including the diffuser and a first growth phase of a gas bubble.
Figure 3B:
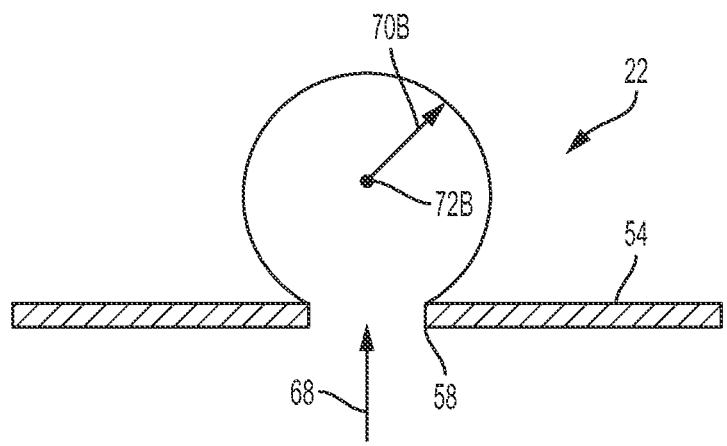
FIG. 3B illustrates a portion of the bubble generation system of FIG. 1 including the diffuser and a second growth phase of the gas bubble.
Figure 3C:
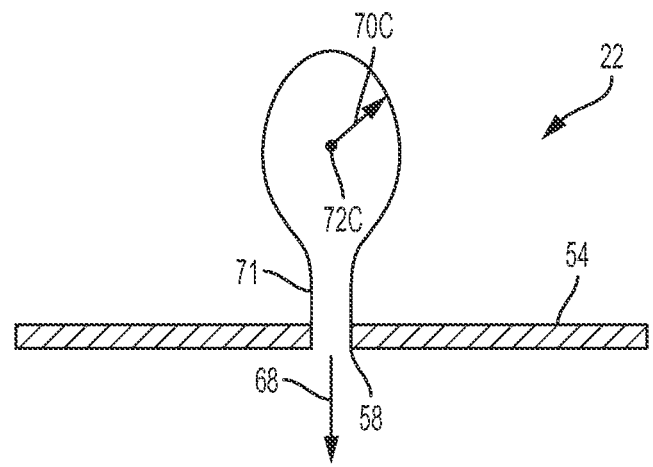
FIG. 3C illustrates a portion of the bubble generation system of FIG. 1 including the diffuser and a contraction phase of the gas bubble.
Figure 3D:
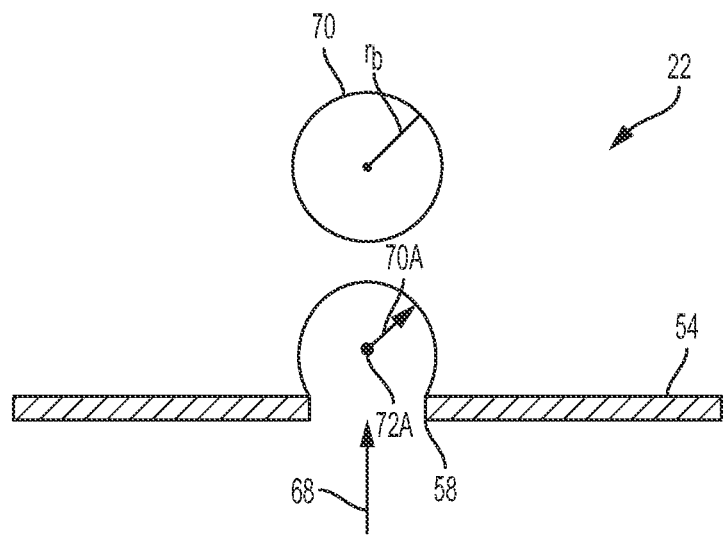
FIG. 3D illustrates a portion of the bubble generation system of FIG. 1 including the diffuser and a detachment phase and the first growth phase of the gas bubble.

FIGS. 3A-D illustrate bubble formation at one of the apertures 58 of the diffuser 22. The gas bubbles 70 are formed by the outgoing pulsating gas flow 68 exiting the diffuser 22. Before the gas bubbles 70 are released from the surface 54 of the diffuser 22, the gas bubbles 70 transition through a series of phases wherein the radius of the gas bubble 70 increases or decreases. In addition, during the series of phases, the radial origin (i.e., the center) of the forming gas bubble 70 moves away from and increases the distance from the surface 54. For example, FIG. 3A illustrates a first growth phase wherein the bubble 70 has a radius 70A and an origin 72A. FIG. 3B illustrates a second growth phase wherein the bubble 70 has a radius 70B that is greater than radius 70A and an origin 72B that is a greater distance from the surface 54 than the origin 72A. FIG. 3C illustrates a contraction phase that defines a radius 70C that is less than the radius 70B and an origin 72C that is a greater distance from the surface 54 than the origin 72B. Thus, between the second growth phase (FIG. 3B) and the contraction phase (FIG. 3C), the radius of the bubble shrinks while the origin of the bubble continues to rise. Additionally, as illustrated in FIG. 3C, the bubble 70 forms a neck portion 71 during the contraction phase. FIG. 3D illustrates a detachment phase wherein the bubble 70 completely forms a radius $r_b$ and separates from the surface 54 of the diffuser 22. FIG. 3D also illustrates the first growth phase initiating again for the generation of a next bubble.

As noted above, the size of a bubble released by an aperture of the diffuser 22 is essentially determined by the balancing of the upward buoyancy force and the downwards interfacial tension and inertial forces. The inertial force $F_I$ can be approximately characterized by the equation:

$$F_I \cong -\frac{4}{3}\pi\rho_l \left[\frac{11}{16}\right]\left(3r_b^2 \frac{dr_b}{dt}\frac{ds}{dt}\right)$$

wherein,
$F_I$ is the inertial force within the gas bubble 70,
$\rho_l$ is the density of the liquid 30,
$r_b$ is the radius of the gas bubble 70, $$\frac{dr_b}{dt}$$

is the differential function of the radius of the gas bubble 70 relative to time, and $$\frac{ds}{dt}$$

is the differential function of the distance of the gas bubble 70 from the surface 54 relative to time.

As the outgoing pulsating gas flow 68 exits the aperture 58, the radius of the gas bubble 70 increases (e.g., radius 70A to radius 70B). In addition, the distance of the gas bubble 70 from the surface 54 increases (e.g., origin 72A to origin 72B). Consequently, the inertial force $F_I$ is a negative (facing downwards) value because the differential functions $$\left(\frac{dr_b}{dt}\right), \left(\frac{ds}{dt}\right)$$

are increasing (both positive). Because the inertial force $F_I$ is a negative value, the inertial force $F_I$ acts downward towards the surface 54 such that the gas bubble 70 maintains attraction and fluid communication with the diffuser 22.

However, during a negative wave cycle of the outgoing pulsating gas flow 68, the origin of the gas bubble 70 continues to move away from the surface 54 (e.g., origin 72B to origin 72C), but the radius decreases (e.g., radius 70B to radius 70C), giving a bottle neck appearance to the gas bubble 70 (FIG. 3C). Consequently, the inertial force $F_I$ switches to a positive (upwards facing) value because the differential function of the radius of the gas bubble 70 relative to time $$\left(\frac{dr_b}{dt}\right)$$

decreases while the differential function of the distance of the gas bubble 70 from the surface 54 relative to time $$\left(\frac{ds}{dt}\right)$$

remains increasing. Because the inertial force $F_I$ is a positive value, the inertial force $F_I$ now acts upward away from the surface 54 such that the gas bubble 70 loses attraction and terminates fluid communication with the diffuser 22. In other words, when the inertial force $F_I$ is positive (e.g., during a negative wave cycle of the outgoing pulsating gas flow 68), the inertial force $F_I$ assists in detachment of the gas bubble 70 from the diffuser 22. This assistance in detachment ultimately results in smaller gas bubbles 70. Without the assistance in detachment from the inertial force caused by the outgoing pulsating gas flow 68 (e.g., if the incoming steady gas flow 34 is the only gas flow used instead) the gas bubble 70 must grow larger before it will detach from the diffuser 22. Therefore, the gas bubbles 70 generated by the diffuser 22 are ultimately smaller because of the induced waves within the outgoing pulsating gas flow 68.

In addition, the outgoing pulsating gas flow 68 is high frequency and low amplitude such that the gas bubble 70 can be efficiently detached from the diffuser 22 without large gas backflows and avoiding potential reversal of the gas bubble 70 back into the diffuser 22.

Therefore, by the wave inducer 18 inducing pressure oscillations in the incoming steady gas flow 34, the outgoing pulsating gas flow 68 conveys periodic pressure pulses to the bubbles being formed on the diffuser 22. The outgoing pulsating gas flow 68 is the mechanism to predictably release the gas bubble 70 from the surface 54 to produce the gas bubble 70 at a desired diameter (e.g., less than 100 micrometers). In other embodiments, the inertial force $F_I$ may be manipulated from a positive value to a negative value via a temporary interruption of gas flow by a valve, a squeeze tube, a fluidic diverter, or the like. For example, the valve is an electronically controlled solenoid. The valve and the squeeze tube may be actuated by a relay switch. The fluidic diverter includes one inlet and two outlets such that pressure pulses are switched between the outlets at a determined frequency by the Coanda effect. Each fluidic diverter outlet provides a pulsating flow of gas that may be supplied to a bubble diffuser inlet.

Figure 4:
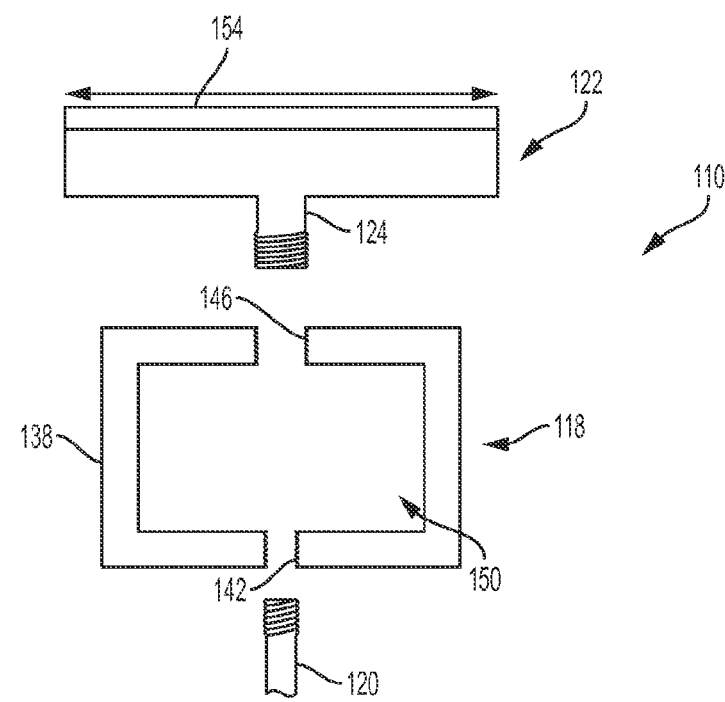
FIG. 4 illustrates a bubble generation system according to a second embodiment of the invention in a vertical orientation.

FIG. 4 illustrates a microbubble generation system 110 according to another embodiment of the invention. The microbubble generation system 110 is similar to the microbubble generation system 10; therefore, like components have been given like reference numbers plus 100 and the description focuses on differences between the microbubble generation system 10 and 110. In addition, components or features described with respect to only one or some of the embodiments of the microbubble generation system 110 are similarly applicable to other embodiments of the microbubble generation systems described herein, and vice versa.

The microbubble generation system 110 includes a cylindrical bubble diffuser 122 having a surface 154 fluidly coupled to a wave inducer 118 by an outlet conduit 124, wherein both the cylindrical bubble diffuser 122 and the wave inducer 118 are submerged within the reservoir 26. The wave inducer 118 is defined by a housing 138 including a cavity 150. The wave inducer 118 is fluidly coupled to a gaseous pressure source (not shown) by an inlet conduit 120. In the illustrated embodiment, the wave inducer 118 is orientated vertically within the reservoir 26. In other words, an inlet 142 is positioned lower than an outlet 146 within the reservoir 26 (a vertical arrangement). However, in some instances, one or both of the inlet 142 and outlet 146 may be on a side wall of the wave inducer 118 (a partial horizontal or horizontal arrangement, respectively).

In the illustrated embodiments of the microbubble generation systems 10, 110, a single wave inducer 18, 118, respectively, is fluidly coupled to the cylindrical bubble diffuser 22, 122. In other embodiments, a plurality of wave inducers 18 (or 118) may be fluidly coupled in series or in parallel orientation to the cylindrical bubble diffuser 22 (or 122). For example, multiple wave inducers 18, 118 that are fluidly coupled in series may be fluidly coupled to one diffuser 22, 122; and multiple wave inducers 18, 118 that are fluidly coupled in parallel may be fluidly coupled to different groups of apertures 58 of one diffuser 22, 122, or independently fluidly coupled to respective diffusers 22, 122.

Figure 5A:
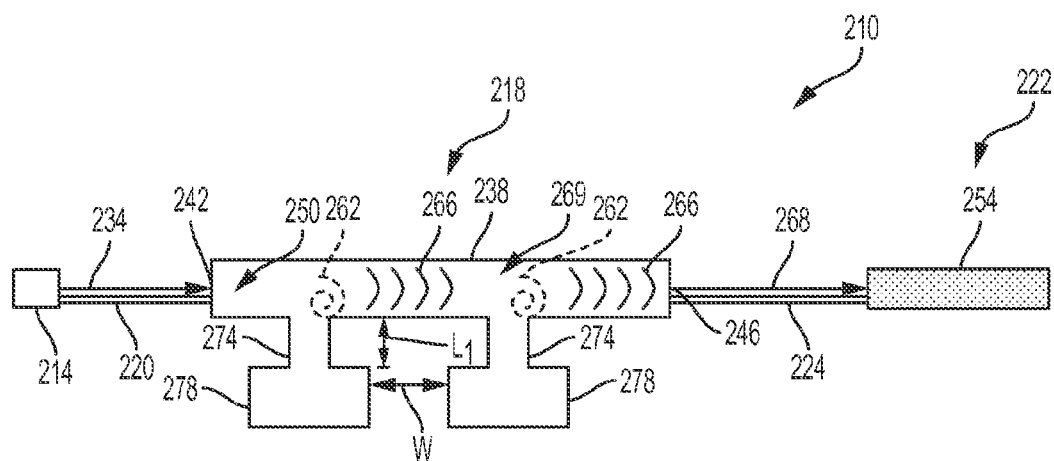
FIG. 5A illustrates a bubble generation system according to a third embodiment of the invention including a plurality of Helmholtz chambers.
Figure 5B:
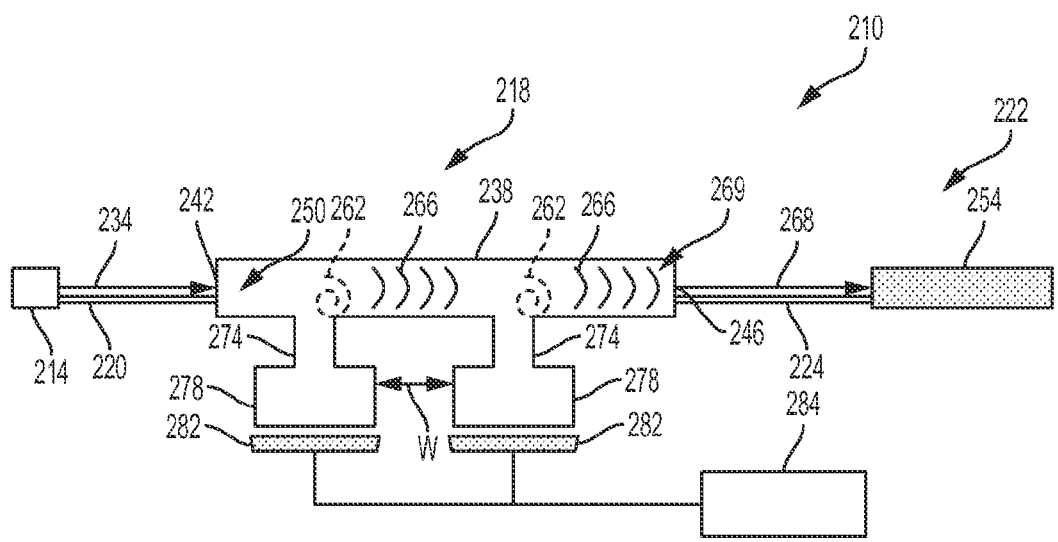
FIG. 5B illustrates the bubble generation system of FIG. 5A including an acoustic source adjacent the Helmholtz chambers.

FIGS. 5A-B illustrate a microbubble generation system 210 according to another embodiment of the invention. The microbubble generation system 210 is similar to the microbubble generation system 10; therefore, like components have been given like reference numbers plus 200 and the description focuses on differences between the microbubble generation system 10 and 210. In addition, components or features described with respect to only one or some of the embodiments of the microbubble generation system 210 are similarly applicable to other embodiments of the microbubble generation systems described herein, and vice versa.

The microbubble generation system 210 includes a plurality of Helmholtz conduits 274 fluidly coupled to a wave inducer 218. The conduits 274 are of length L1 and are orientated substantially perpendicular to the wave inducer 218. In the illustrated embodiment, the conduits 274 are also fluidly coupled to Helmholtz chambers 278. The Helmholtz chambers 278 are located a distance W from each other. In other embodiments, a single conduit 274 may be fluidly coupled to the wave inducer 218, three or more conduits 274 are coupled to the wave inducer 218, and/or one or more of the Helmholtz chamber 278 may be omitted.

As an incoming steady gas flow 234 enters the wave inducer 218 (via inlet 242) from a gaseous pressure source 214 through an inlet conduit 220, the steady gas flow 234 transitions into the vortex-ring flow patterns 262, and passes by the conduits 274, a vortical-acoustic effect is produced creating the acoustic waves 266. A shear layer develops on the walls of a cavity 250, which is defined by a housing 238, that detaches at the edge of the entrance to the conduits 274. Detachment occurs in the form of periodic vortex rings that collide with the downstream edge (e.g., near outlet 246) of the cavity 250. The vortices impinge on this edge and generate acoustical disturbances that are amplified by the Helmholtz chambers 278 and/or the cavity 250. The vortical-acoustic effect is characterized by the Helmholtz effect, wherein the acoustic disturbances are amplified when the frequency of the disturbances substantially matches the natural frequency of the Helmholtz chambers 278. Thus, the gas flow exiting the wave inducer 218 through an outlet conduit 224 is an outgoing pulsating gas flow 268 having acoustic waves 266 therein. By way of reference, the gas flow between the inlet 242 and the outlet 246 of the wave inducer 218 can be characterized as a transitioning gas flow 269. The outgoing pulsating gas flow 268 exits from the system 210 through a surface 254 of a diffuser 222. The wave inducer 218 may be constructed with one, two (shown) or more conduits 274.

Although the acoustic waves 266 are illustrated propagating downstream in FIGS. 5A-B, the acoustic waves 266 propagate in other directions as well. The acoustic waves 266 traveling upstream enhance the detachment of the boundary layer at the edge of the conduits 274, also creating periodic vortices, which, in turn, create more acoustic waves 266. Thus, the microbubble generation system 210 has a self-reinforcing nature, similar to other embodiments described herein.

In reference to FIG. 5B, the microbubble generation system 210 includes an acoustic source 282 (e.g., a speaker) acoustically coupled to the Helmholtz chamber(s) 278. In the illustrated embodiment, the acoustic source 282 is in direct contact with an exterior surface of the Helmholtz chamber(s) 278. In other embodiments, the acoustic source 282 replaces or defines an exterior surface of the Helmholtz chamber(s) 278, or the acoustic source 282 may be located and secured within the Helmholtz chamber(s) 278. In one example, the output side of a cone-shaped loudspeaker, which may be flanged, serves as one of the walls of the Helmholtz chambers 278. The acoustic source 282 is driven by a controller 284 to output acoustic waves 266 toward the Helmholtz chambers 278. The controller 284 is electrically coupled to the acoustic sources 282 to provide a driving signal, such as an audio signal. The acoustic source 282 is driven to generate acoustic waves 266 that provide more precise perturbations of the vortex-ring flow patterns 262 within the wave inducer 218. Thus, the acoustic sources 282 are used to improve generation and control of the waves in the outgoing pulsating gas flow 268.

Figure 6:
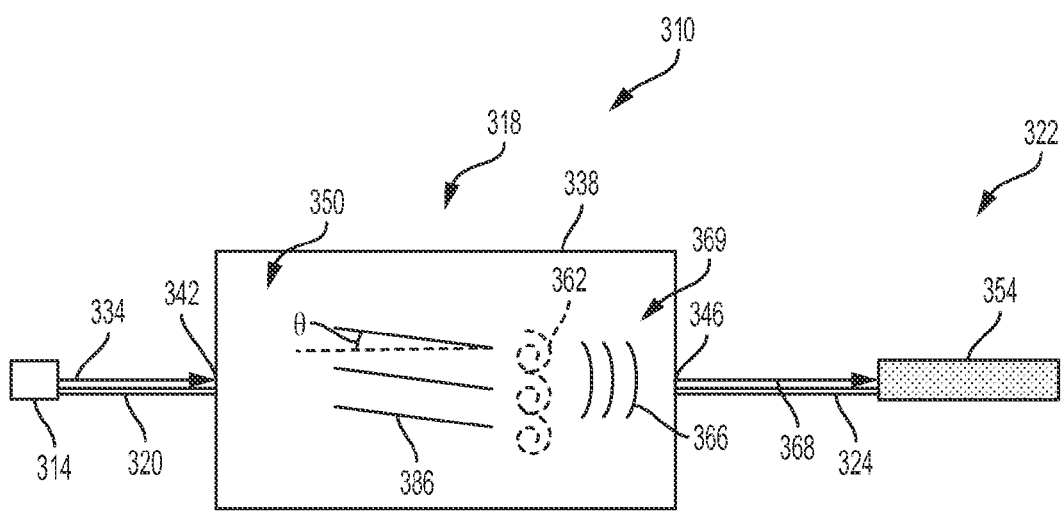
FIG. 6 illustrates a bubble generation system according to a fourth embodiment of the invention including a plurality of foil members.

FIG. 6 illustrates a microbubble generation system 310 according to another embodiment of the invention. The microbubble generation system 310 is similar to the microbubble generation system 10; therefore, like components have been given like reference numbers plus 300 and the description focuses on differences between the microbubble generation system 10 and 310. In addition, components or features described with respect to only one or some of the embodiments of the microbubble generation system 310 are similarly applicable to other embodiments of the microbubble generation systems described herein, and vice versa.

The microbubble generation system 310 includes a wave inducer 318 that is defined by a housing 338 having a cavity 350. The wave inducer 318 includes a plurality of foil members 386 positioned at an oblique angle θ relative to an incoming steady gas flow 334 supplied by a gaseous pressure source 314 through an inlet conduit 320 and an inlet 342. The foil members 386 are fixed within the cavity 350 in various manners. For instance, one end of each foil member 386 may be secured to a surface within the cavity 350, such a wall defining the cavity 350. The other end of the foil member 386, which extends toward the inlet 342, may be free.

Vortex-ring flow patterns 362 are produced downstream from the foil members 386. The vortex-ring flow patterns 362 form acoustic waves 366 that, in turn, are amplified within the cavity 350 when the system operates at the resonant frequency. Thus, the gas flow exiting the wave inducer 318 is an outgoing pulsating gas flow 368 due to the sustained acoustic waves 366 within the cavity 350. The outgoing pulsating gas flow 368 exits the wave inducer 318 by an outlet 346 and an outlet conduit 324 to a diffuser 322, and then exits the system 310 through a surface 354 of the diffuser 322. By way of reference, the gas flow between the inlet 342 and the outlet 346 of the wave inducer 318 can be characterized as a transitioning gas flow 369.

In the illustrated embodiment, the foil members 386 are rigid. In other embodiments, the foil members 386 may be flexible such that the gas flow causes periodic movement or vibration of the foil members 386. The induced vibration of the foil members 386 amplifies the vortex-ring flow patterns 362. In addition, the microbubble generation system 310 may only include a single foil member 386, two foil members 386, or several foil members 386. The foil members 386 are vortex inducing bodies. In some embodiments, other types of vortex inducing bodies are included, such as bodies with a less aerodynamic profile. Example alternative vortex inducing bodies include triangular bodies, conical wedge bodies, blunt bodies, sphere bodies, or the like.

Figure 7:
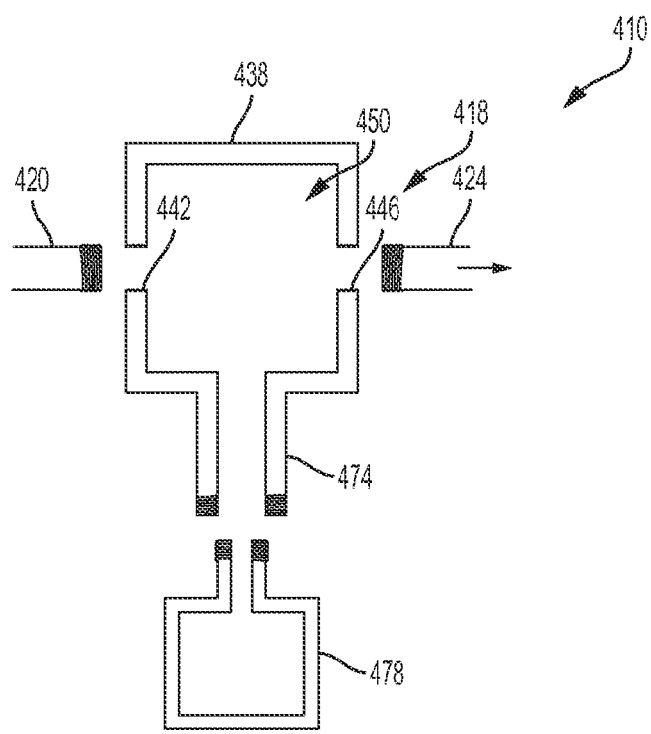
FIG. 7 illustrates a bubble generation system according to a fifth embodiment of the invention including retrofittable components.

FIG. 7 illustrates a microbubble generation system 410 according to another embodiment of the invention. The microbubble generation system 410 is similar to the microbubble generation system 10; therefore, like components have been given like reference numbers plus 400 and the description focuses on differences between the microbubble generation system 10 and 410. In addition, components or features described with respect to only one or some of the embodiments of the microbubble generation system 410 are similarly applicable to other embodiments of the microbubble generation systems described herein, and vice versa.

The microbubble generation system 410 includes a wave inducer 418 defined by a housing 438 having a cavity 450 with an inlet 442 and an outlet 446. The inlet 442 is coupled to an inlet conduit 420, whereas the outlet 446 is coupled to an outlet conduit 424. In addition, the microbubble generation system 410 includes retrofitable or interchangeable components. For example, a Helmholtz chamber 478 is optionally coupled to a conduit 474, and the conduit 474 is coupled to the wave inducer 418. The Helmholtz chamber 478, the conduit 474, and the wave inducer 418 may be coupled by threads, flanged, quick-connects, or the like. The retrofitable components enable one to easily modify and fine-tune the a gas flow passing through the wave inducer 418 by selecting or exchanging components having different dimensions. For example, one can swap the Helmholtz chamber 478 for another one having a larger or smaller cavity and/or neck to alter the strength or frequency of the air flow, to ultimately improve bubble generation. Alternatively, one can swap the Helmholtz chamber 478 for a cap that closes the open end of the conduit 474.

The retrofitability of the microbubble generation system 410 is also applicable to other embodiments as previously described. That is, each of the microbubble generation systems described herein may be implemented such that they can be retrofitted to existing diffuser-based microbubble generation systems. For example, each wave inducer 18, 118, 218, and 318 may include threaded inlets and outlets (or other connection types, as noted above), such that they can be inserted into an existing gas supply stream, upstream from an associated diffuser, to reduce the size of bubbles being generated, and improve the efficiency of particle separation by flotation or increase gas transfer rates to a liquid by using smaller bubbles.

Figure 8:
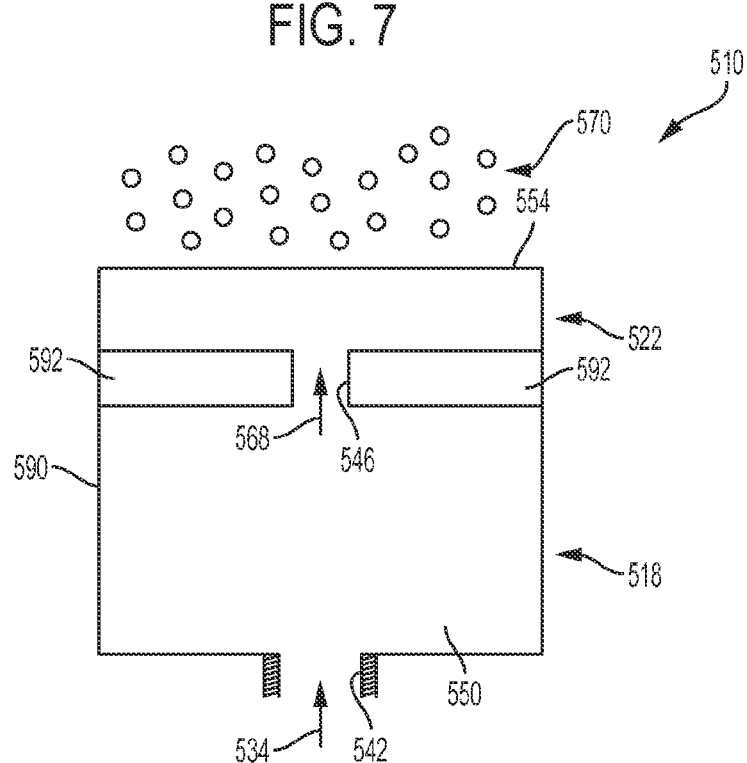
FIG. 8 illustrates a bubble generation system according to a sixth embodiment of the invention including an integrally formed wave inducer and bubble diffuser.

FIG. 8 illustrates a microbubble generation system 510 according to another embodiment of the invention. The microbubble generation system 510 is similar to the microbubble generation system 10; therefore, like components have been given like reference numbers plus 500 and the description focuses on differences between the microbubble generation system 10 and 510. In addition, components or features described with respect to only one or some of the embodiments of the microbubble generation system 510 are similarly applicable to other embodiments of the microbubble generation systems described herein, and vice versa.

The microbubble generation system 510 includes a wave inducer 518 that is integrally formed with the bubble diffuser 522 as one component. In other words, the wave inducer 518 and the bubble diffuser 522 include the same structural housing 590. An incoming steady gas flow 534 is received at a threaded inlet 542. The wave inducer 518 generates an outgoing pulsating gas flow 568, which is supplied to the diffuser 522 via an outlet 546. The wave inducer 518 is separated from the diffuser 522 by a wall 592, and the outlet 546 extends through the wall 592. In some embodiments, the inlet 542 is located on a surface of the wave inducer 518 other than the bottom surface as shown in FIG. 8. The outgoing pulsating gas flow 568 then exits the diffuser 522 through a surface 554 including a plurality of apertures (not shown) to produce gas bubbles 570.

FIGS. 9-14 illustrate a microbubble generation system 610 according to another embodiment of the invention. The microbubble generation system 610 is similar to the microbubble generation system 10; therefore, like components have been given like reference numbers plus 600 and the description focuses on differences between the microbubble generation system 10 and 610. In addition, components or features described with respect to only one or some of the embodiments of the microbubble generation system 610 are similarly applicable to other embodiments of the microbubble generation systems described herein, and vice versa.

Figure 9:
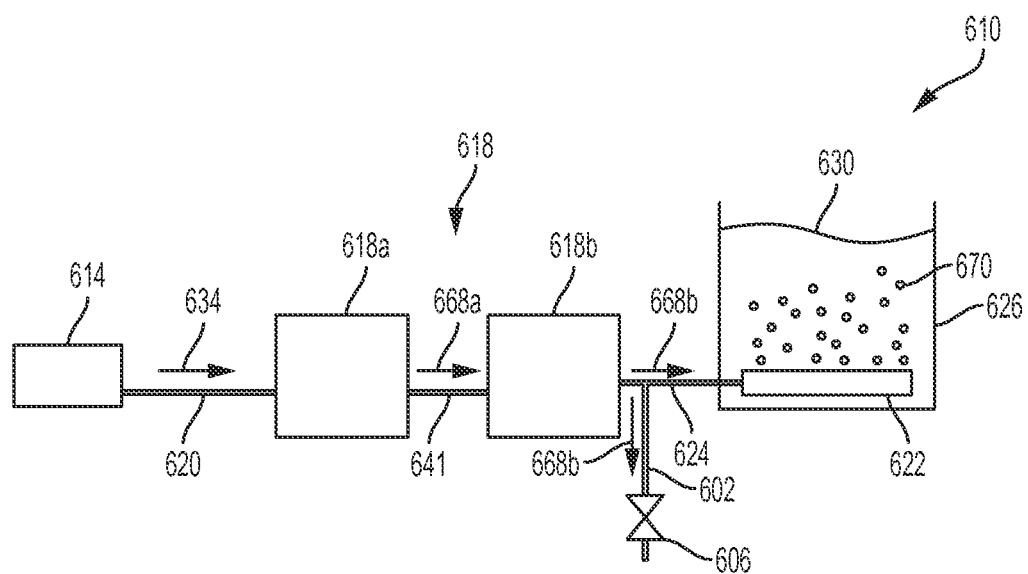
FIG. 9 illustrates a bubble generation system including a gaseous pressure source, a first wave inducer, a second wave inducer, a venting passageway, and a diffuser according to a seventh embodiment of the invention.

With reference to FIG. 9, the microbubble generation system 610 includes a gaseous pressure source 614 fluidly coupled to a wave inducer 618 via an inlet conduit 620, and the wave inducer 618 is fluidly coupled to a diffuser 622 via an outlet conduit 624. The gaseous pressure source 614 provides an incoming steady gas flow 634 to the wave inducer 618, and the wave inducer 618 transitions the incoming steady gas flow 634 into an outgoing pulsating gas flow 668. In the illustrated embodiment, the wave inducer 618 includes a first wave inducer 618a producing a first outgoing pulsating gas flow 668a that is fluidly coupled to a second wave inducer 618b producing a second outgoing pulsating gas flow 668b. In particular, the first wave inducer 618a is fluidly coupled to the second wave inducer 618b by an intermediate conduit 641, thus the first outgoing pulsating gas flow 668a passes through the intermediate conduit 641 before entering the second wave inducer 618b. The second outgoing pulsating gas flow 668b then travels through the diffuser 622, which is located within a reservoir 626 containing a liquid 630 having impurities, to produce a plurality of gas bubbles 670 that are released within the liquid 630. In other embodiments, the second wave inducer 618b may be fluidly coupled between the inlet conduit 620 and the intermediate conduit 641, and the first wave inducer 618a may be fluidly coupled between the intermediate conduit 641 and the outlet conduit 624.

In continued reference to FIG. 9, a vent passageway 602 is fluidly coupled to the outlet conduit 624 between the diffuser 622 and the wave inducer 618. The illustrated vent passageway 602 provides fluid communication between the outlet conduit 624 and an ambient environment (e.g., consisting generally of atmospheric pressure). In other words, while the diffuser 622 provides a first outlet to the second pulsating gas flow 668b, the vent passageway 602 provides a second outlet to the second pulsating gas flow 668b. In other embodiments, the vent passageway 602 may be coupled between the wave inducers 618a, 618b.

A vent valve 606 is fluidly coupled to the vent passageway 602 and is configured to regulate fluid flow rate through the vent passageway 602. In the illustrated embodiment, the vent valve 606 may be any suitable valve to regulate fluid flow rate; for example, the vent valve 606 may be a butterfly valve, a needle valve, or the like. In other embodiments, the vent valve 606 may include a check valve to inhibit backflow of ambient air into the outlet conduit 624. Furthermore, the vent valve 606 and the vent passageway 602 may be included within previous embodiments of the microbubble generation system. For example, the vent valve 606 and the vent passageway 602 may be included within the microbubble generation system 10 (FIG. 1), wherein the vent valve 606 and the vent passageway 602 are fluidly coupled to the outlet conduit 24 and positioned between the wave inducer 18 and the diffuser 22.

Figure 10:
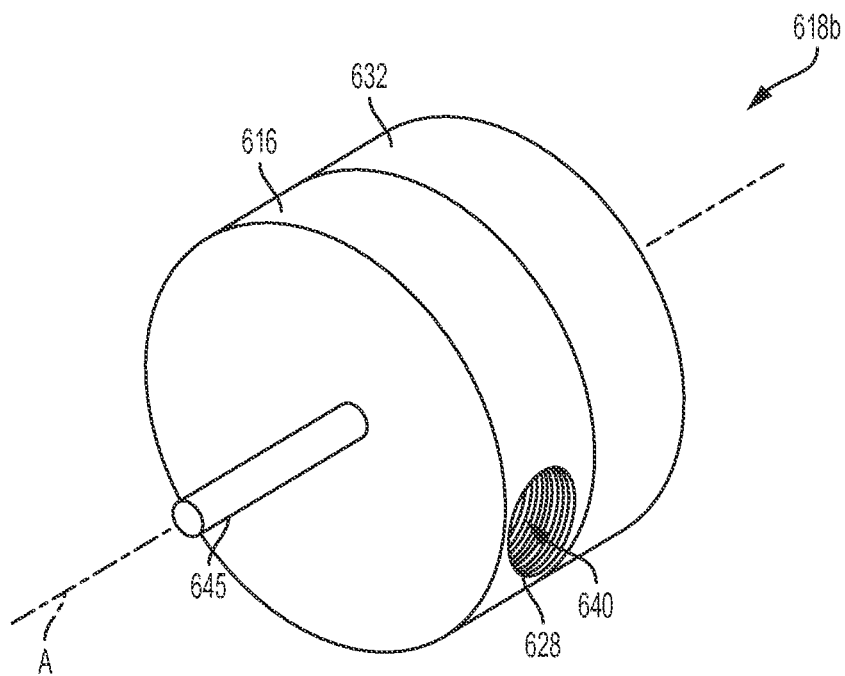
FIG. 10 is a perspective view of the second wave inducer of FIG. 9.
Figure 11:
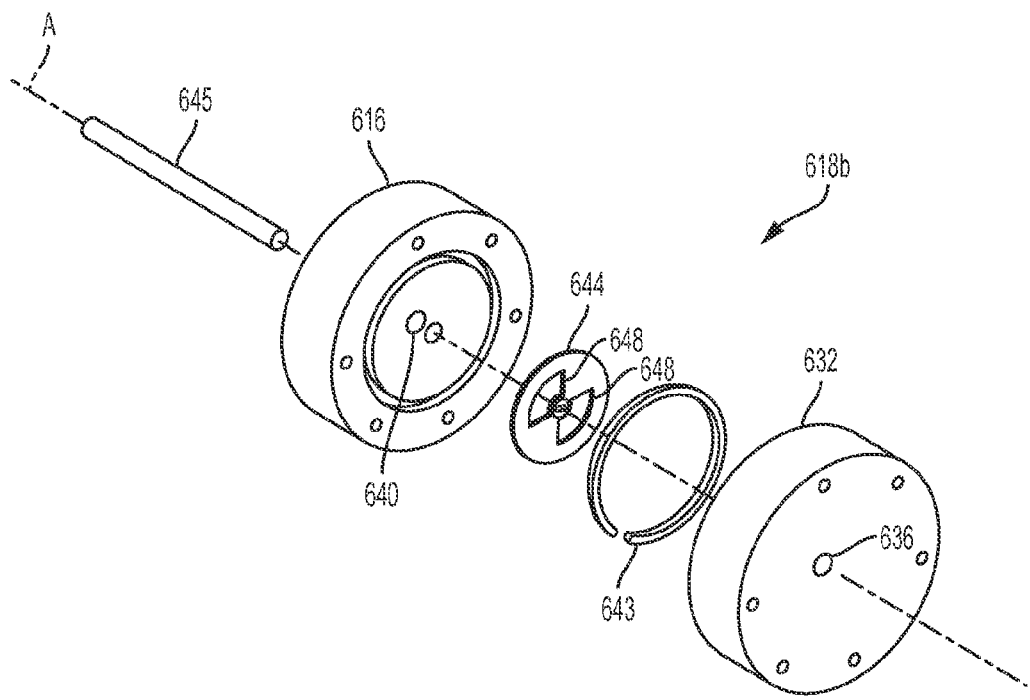
FIG. 11 is an exploded view of the second wave inducer of FIG. 10.
Figure 12:
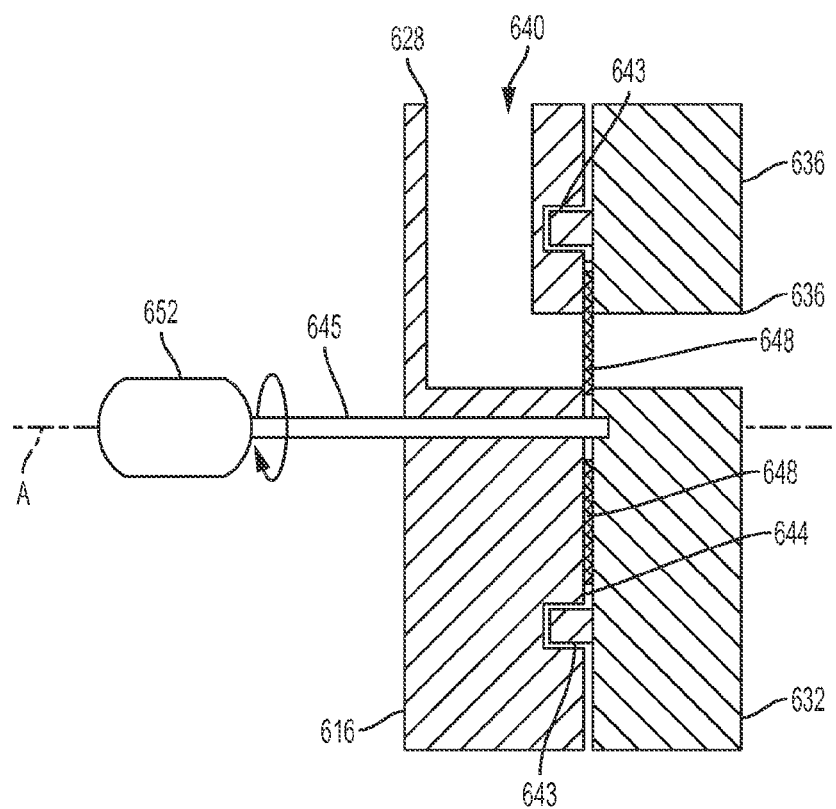
FIG. 12 illustrates the second wave inducer of FIG. 9 operable by a motor.

The illustrated second wave inducer 618b is structurally similar to the wave inducer 18, and as such, the second wave inducer 618b functions similar to the wave inducer 18. As shown in FIGS. 10-12, the first wave inducer 618a illustrates a rotary valve including a first body portion 616 having an inlet 628 and a second body portion 632 having an outlet 636 (FIG. 12). In the illustrated embodiment, the inlet 628 is located on a circumferential surface of the first body portion 616, whereas the outlet 636 is located on a flat surface of the second body portion 632. In other embodiments, the inlet 628 may be located on a flat surface of the first body portion 616, and/or the outlet 636 may be located on a circumferential surface of the second body portion 632. In addition, a passageway 640 extends through the body portions 616, 632 and fluidly couples the inlet 628 to the outlet 636. The body portions 616, 632 are secured together by a plurality of bolts with a gasket 643 positioned therebetween to fluidly seal the body portions 616, 632.

Located between the body portions 616, 632 is a fluctuating member 644 rotatable about a central axis A of the first wave inducer 618a by a shaft 645. The central axis A is generally parallel to the passageway 640 (FIG. 12). The illustrated fluctuating member 644 is defined by a cylindrical plate including two apertures 648 located 180 degrees apart. The apertures 648 are sized and positioned to align with the passageway 640. In other embodiments, the fluctuating member 644 may include less than or more than two apertures. In further embodiments, the fluctuating member 644 may include slots in replace of the apertures 648, wherein the slots open to a periphery of the cylindrical plate.

With reference to FIG. 12, a rotational source (motor) 652 is coupled to the shaft 645 and operable to rotate the fluctuating member 644 about the central axis A. The illustrated motor 652 may be an electric motor powered by either a DC or AC power supply. In other embodiments, the motor 652 may be omitted resulting in a passive first wave inducer 618a. Stated another way, the fluctuating member 644 rotates about the central axis A by the airflow passing through the passageway 640. In addition, the fluctuating member 644 rotates parallel to the outlet conduit 624. The passive first wave inducer 618a is analogous to a fan. In this embodiment, the fluctuating member 644 defines a plurality of angled surfaces between the apertures 648. Thus, when an airflow travels through the passageway 640, the airflow interacts with the angled surfaces to rotate the fluctuating member 644. As a result, the velocity of the airflow within the passageway 640 is dependent upon the rotational velocity of the fluctuating member 644 and vice-versa. In further embodiments, the passive first wave inducer 618a includes the cylindrical plate having the apertures 648 (FIG. 11), but the rotational axis of the cylindrical plate is orientated at an angle relative to the central axis A. As a result, the cylindrical plate itself is an angled surface with respect to the passageway 640, and this angle results in rotation of the fluctuating member 644 by the airflow. In other further embodiments, the shaft 645 may be directly rotated by the steady gas flow 634. For example, a plurality of blades may be coupled to the shaft 645, wherein the blades are in fluid communication with a secondary airflow. The secondary airflow may be a portion of the steady gas flow 634 from the inlet conduit 620. As the secondary airflow passes by the blades, the shaft 645 rotates, which rotates the fluctuating member 644, dependently of the velocity of the secondary airflow. Therefore, to control the angular velocity of the fluctuating member 644, the velocity of the secondary airflow is regulated (e.g., with a valve in line with a pathway for the secondary airflow or by particularly sizing the pathway).

In further embodiments, the first wave inducer 618a may be an oscillating needle valve operable by an electrical solenoid and/or the motor 652. The needle valve is coupled to the outlet conduit 624 and oscillates generally perpendicular to the outlet conduit 624. In particular, the needle valve oscillates between an open condition, wherein an input of the first wave inducer 618a is in fluid communication with the diffuser 622, and a closed condition, wherein fluid communication between the input of the first wave inducer 618a and the diffuser 622 is blocked. In other embodiments, the closed condition may be where the needle valve partially blocks fluid communication between the input of the first wave inducer 618a and the diffuser 622.

The first wave inducer 618a is utilized to produce the first pulsating gas flow 668a from the steady gas flow 634. As the fluctuating member 644 rotates about the central axis A, the apertures 648 intermittently align with the passageway 640. When aligned, in a first instance in time, the steady gas flow 634 passes through the fluctuating member 644 to the outlet 636. When unaligned, in a second instance in time, the steady gas flow 634 is blocked from passing through the fluctuating member 644. The first wave inducer 618a reciprocates between the first and the second instances in time to produce the first pulsating gas flow 668a. Generally, the first wave inducer 618a alone produces a frequency on a magnitude of less than about 50 Hz.

Therefore, by coupling the first and the second wave inducers 618a, 618b together, a broader frequency spectrum than that produced by the first and the second wave inducers 618a, 618b alone is observed. In other words, the result is the second pulsating gas flow 668b having a superimposed acoustic wave to the first pulsating gas flow 668a produced by the first wave inducer 618a. Generally, the second wave inducer 618b produces a frequency of the second pulsating gas flow 668b on a magnitude of about 100 to 200 Hz.

Figure 13:
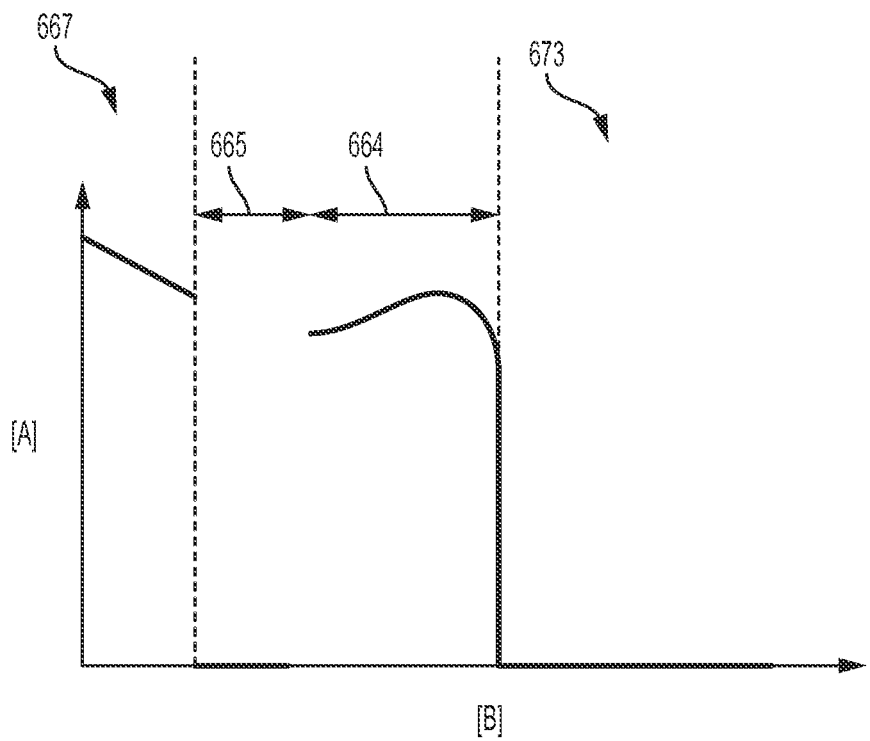
FIG. 13 illustrates a relationship between a gas flow rate exiting the diffuser of FIG. 9 and a gas flow rate exiting the venting passageway.

In operation, it is desirable to obtain an optimal frequency of the second pulsating gas flow 668b to produce an optimal size of the gas bubbles 670. With reference to FIGS. 9 and 13, the vent passageway 602 is operable to control an optimal size of the gas bubbles 670 by discharging a portion of the second pulsating gas flow 668b to the ambient environment. In particular, the vent valve 606 regulates a flow rate commonly measured in cubic feet per minute (CFM) of the second pulsating gas flow 668b exiting the outlet conduit 624 through the vent passageway 602. For example, the vent valve 606 can be closed to supply a maximum flow of the second pulsating gas flow 668b to the diffuser 622, or the vent valve 606 can be adjusted to supply a portion of the maximum flow of the second pulsating gas flow 668b to the diffuser 622. FIG. 13 illustrates a relationship between adjusting the vent valve 606 and the flow of the second pulsating gas flow 668b exiting the diffuser 622. Specifically, the flow rate through the vent valve 606 is represented on horizontal axis B, and the flow of the second pulsating gas flow 668b exiting the diffuser 622 is represented on vertical axis A. In general, there is an operating range 664 defining a range of flow rates through the vent valve 606 that yield optimum frequencies of the second pulsating gas flow 668b. With a flow rate through the vent valve 606 below the operating range 664, the second pulsating gas flow 668b will be either in a no flow condition 665 (e.g., the second pulsating gas flow 668b does not exit from the diffuser 622) or a turbulent condition 667. With a flow rate through the vent valve 606 above the operating range 664, the flow of the second pulsating gas flow 668b will tend to zero resulting in a back flow or creeping in condition 673 of the liquid 630 into the diffuser 622.

Figure 14:
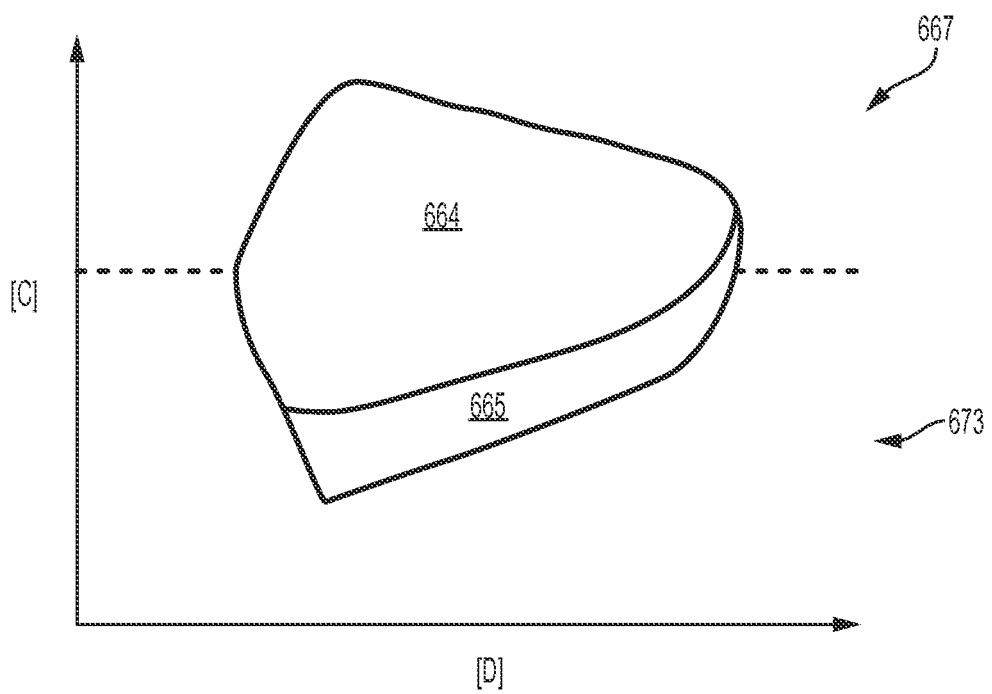
FIG. 14 illustrates a relationship between a gas flow rate entering the second wave inducer of FIG. 9 and a frequency of the gas flow exiting the second wave inducer.

With reference to FIGS. 9 and 14, the second wave inducer 618b converts the first pulsating gas flow 668a into the second pulsating gas flow 668b. The frequency of the second pulsating gas flow 668b is dependent upon the flow rate of the first pulsating gas flow 668a as shown in FIG. 14. In particular, the horizontal axis D represents frequency commonly measured in Hertz (Hz), whereas the vertical axis C represents flow of the first pulsating gas flow 668a commonly measured in cubic feet per minute (CFM). As illustrated, the operating range 664 occurs between a minimum and a maximum range of frequencies. If the frequency is too high, the second pulsating gas flow 668b will not be observed, and if the frequency is too low, the turbulent condition 667 or the creeping in condition 673 may be observed from the diffuser 622. In addition, a minimum and a maximum range of flows are necessary to observe the operating range 664. The no flow condition 665 is observed when the frequencies are in the acceptable range but the flow of the first pulsating gas flow 668a is insufficient.

Therefore, to optimize the size of the gas bubbles 670 exiting the diffuser 622, the frequency or the flow rate of the second pulsating gas flow 668b may be independently or dependently regulated.

In other embodiments of the microbubble generation system 610, the wave inducer 618 may only include the first wave inducer 618a. For example, the rotary valve or the oscillating needle valve may be fluidly coupled to the inlet conduit 620 and the outlet conduit 624 between the gaseous pressure source 614 and the diffuser 622. In addition, the first wave inducer 618a may also produce two distinct pulsating gas flows that are superimposed onto each other to produce the second pulsating gas flow 668b. For example, a particular geometric configuration of the inlet 628, the passageway 640, and/or the outlet 636 produces a first pulsating gas flow as the steady gas flow 634 passes through the first wave inducer 618a, and the fluctuating member 644 produces a second pulsating gas flow. Thus, the first wave inducer 618a alone produces the second pulsating gas flow 668b.

Figure 15:
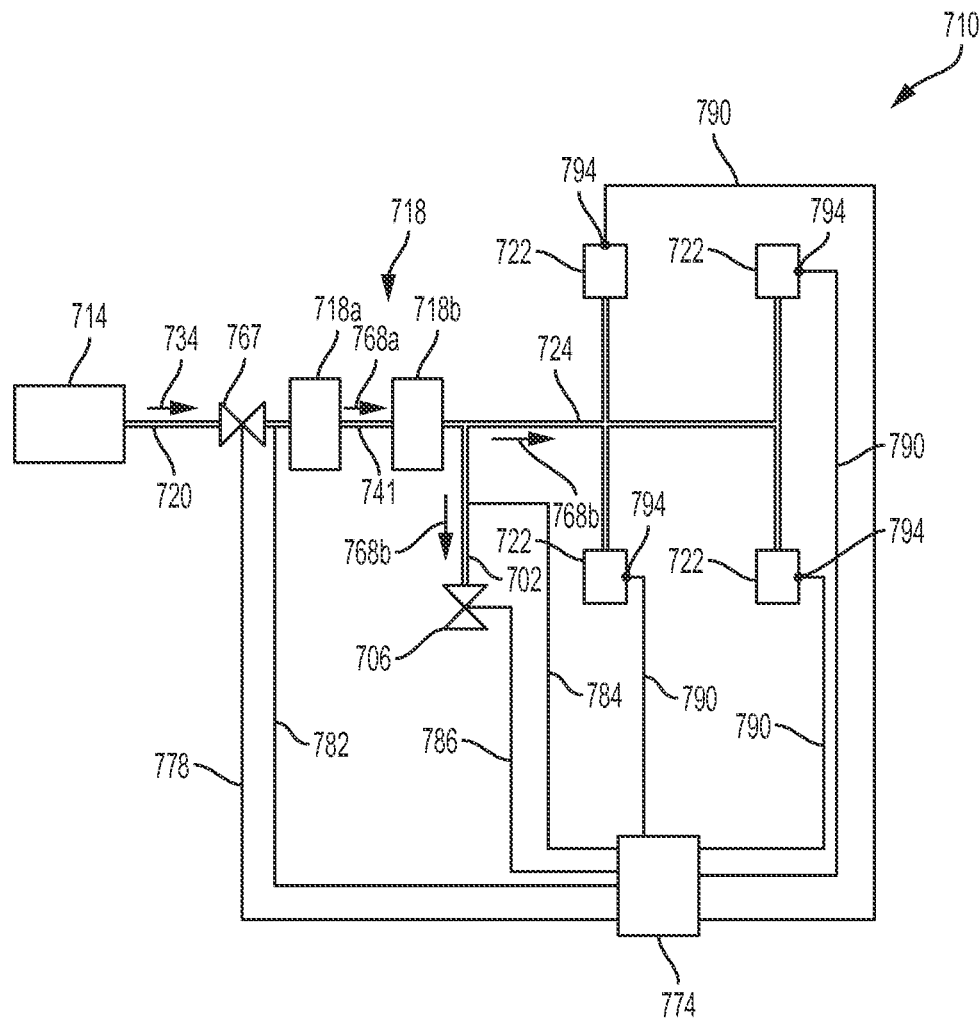
FIG. 15 illustrates a bubble generation system according to an eighth embodiment of the invention including a control system.

FIG. 15 illustrates a microbubble generation system 710 according to another embodiment of the invention. The microbubble generation system 710 is similar to the microbubble generation system 610; therefore, like components have been given like reference numbers plus 100 and the description focuses on differences between the microbubble generation system 610 and 710. In addition, components or features described with respect to only one or some of the embodiments of the microbubble generation system 710 are similarly applicable to other embodiments of the microbubble generation systems described herein, and vice versa.

The microbubble generation system 710 includes a gaseous pressure source 714 providing an incoming steady gas flow 734 that is fluidly coupled to a wave inducer 718 via an inlet conduit 720, and the wave inducer 718 is fluidly coupled to a plurality of diffusers 722 via an outlet conduit 724. In some embodiments, each of the diffusers 722 may be associated with individual reservoirs (not shown) including a liquid with impurities, or the plurality of diffusers 722 may be associated with the same reservoir. In the illustrated embodiment, the wave inducer 718 includes a first wave inducer 718a producing a first outgoing pulsating gas flow 768a and is fluidly coupled to a second wave inducer 718b producing a second outgoing pulsating gas flow 768b. In particular, the first wave inducer 718a is fluidly coupled to the second wave inducer 718b by an intermediate conduit 741, thus the first outgoing pulsating gas flow 768a passes through the intermediate conduit 741 before entering the second wave inducer 718b.

The microbubble generation system 710 also includes a vent passageway 702 coupled to a vent valve 706 that is in fluid communication with the outlet conduit 724, and a control valve 767 that is in fluid communication with the inlet conduit 720. The control valve 767 is configured to control the flow rate of the steady gas flow 734 from the gaseous pressure source 714 into the first wave inducer 718a. As such, the control valve 767 may be any suitable valve that regulates air flow (e.g., butterfly valve, needle valve, etc.).

The microbubble generation system 710 also includes a controller 774 coupled to the control valve 767, the vent valve 706, and each of the diffusers 722. In particular, the controller 774 is coupled to the control valve 767 by an electrical line 778 to operate the control valve 767 (e.g., to open or close the control valve 767) as the controller 774 dictates. In addition, a sensor line 782 is coupled to the controller 774 and an inlet sensor at the inlet conduit 720 and is operable to measure a pressure, flow rate, or the like of the steady gas flow 734 to relay back to the controller 774. Likewise to the electrical line 778, an electrical line 786 is coupled to the controller 774 and the vent valve 706 to operate the vent valve 706 as the controller 774 dictates. A sensor line 784 is coupled to the controller 774 and the vent passageway 702 and is operable to measure a pressure, flow rate, or the like of the second pulsating gas flow 768b to relay back to the controller 774.

In the illustrated embodiment, each of the diffusers 722 are coupled to the controller 774 by individual sensor lines 790 that are coupled to sensors 794. The illustrated sensors 794 are positioned near the diffusers 722 and are configured to monitor the size of the microbubbles released from the diffuser 722. The sensors 794 may measure a diameter of a single bubble, or the sensors 794 may measure diameters of a population (e.g., a sample size or bubble size distribution) of a plurality of bubbles released from the diffusers(s) 722. The sensors 794 may be an electro-optical sensor, a laser sensor, an ultrasound sensor, or the like. For example, the sensors 794 may be a Mettler Toledo Lasentec D600 sensor utilizing laser beam reflectance technology, a Horiba LKA960 sensor utilizing laser diffraction technology, or a Dynaflow Inc. ABS sensor utilizing acoustic spectrometry technology. The sensors 794 are constructed to identify and measure at least one microbubble released from the diffusers 722 to relay to the controller 774. For example, the sensors 794 may measure an outside diameter of a microbubble.

Therefore, the microbubble generation system 710 is self-regulating by the controller 774 to optimize the size of the microbubbles released by the diffusers 722. For example, if the sensors 790 measure a bubble's diameter that is above an optimal size, then the controller 774 may regulate (e.g., open or close) the vent valve 706 by the electrical line 786, and/or the controller 774 may regulate (e.g., open or close) the control valve 778 by the electrical line 778. As such, by manipulating the steady gas flow 734 (via the control valve 767) and/or the second pulsating gas flow 768b (via the vent valve 706), the microbubble size will be altered and thus again measured by the sensors 794. In addition, sensor lines 782, 784 may measure the steady gas flow 734 and the second pulsating gas flow 768b (e.g., flow rate, pressure, etc.), respectively, to further regulate and manage the size of the mircobubbles released from the diffusers 722.

Figure 16:
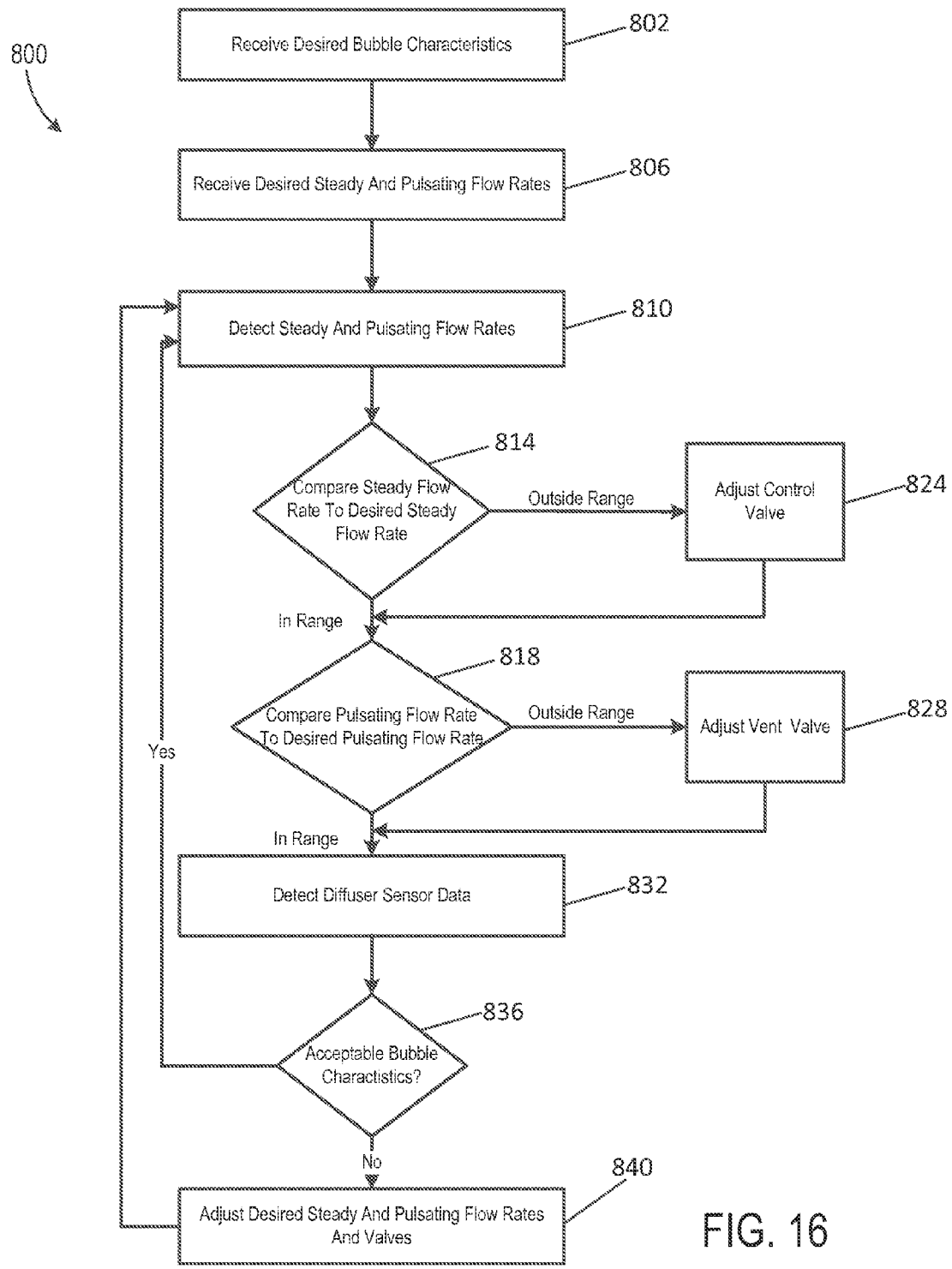
FIG. 16 illustrates an exemplary control method implemented by the bubble generation system of FIG. 15.

FIG. 16 illustrates an exemplary control method 800 implemented by the system 710 and controlled by the controller 774. The illustrated control method 800 optimizes a characteristic or parameter of the gas bubbles released from the diffusers 722. For example, the diameter of the gas bubbles is the characteristic to the performance of the system 710. However, other characteristics of the gas bubbles may be measured to optimize the performance of the system 710. Steps 802 and 806 include a set parameter or a threshold that the controller 774 uses to regulate the system 710. In particular, the step 802 includes an acceptable range of diameters of the gas bubbles, and the step 806 includes an acceptable range of flow rates (e.g., velocity) of the steady gas flow 734 and the pulsating gas flow 768. The values received in steps 802 and 806 may be default values saved in a memory of the controller 774, or may be input by a user via a user interface of the controller 774 (e.g., graphical user interface, keypad, or rotatable dial).

During step 810, the actual flow rates of the steady gas flow 734 and the second pulsating gas flow 768b are measured, respectively, to relay to the controller 774. In particular, the steady gas flow 734 is measured from the sensor line 782, and second pulsating gas flow 768b is measured from the sensor line 784. In other embodiments, the step 810 may include measuring the second pulsating gas flow 768b directly from the outlet conduit 724.

By measuring the actual flow rates, the controller 774 compares the actual and the set parameters of the flow rates as illustrated in steps 814 and 818. In particular, the actual steady gas flow 734 (as measured in step 810) is compared to the set parameter steady gas flow 734 (as indicated in step 806). If the actual steady gas flow 734 is outside of an acceptable range (e.g., 0.1%, 1%, 2.5%, 5%, or 10%) of the set parameter steady gas flow 734, then the method 800 transitions to step 824 to adjust the control valve 767 by the electrical line 778. For instance, when the actual steady gas flow 734 is low, as determined in step 814, the control valve 767 is controlled to close a certain amount to increase the flow through the inlet conduit 720, whereas, when the actual steady gas flow 734 is high, the control valve 767 is controlled to open a certain amount. However, if the actual steady gas flow 734 is inside the acceptable range, the method 800 continues to step 818. Step 818 is similar to step 814 but with the actual second pulsating gas flow 768b (as measured in step 810) compared to an acceptable range (e.g., 0.1%, 1%, 2.5%, 5%, or 10%) of the set parameter (as indicated in step 806). If the actual second pulsating gas flow 768b is outside the acceptable range, then the method 800 transitions to step 828 to adjust the vent valve 706 by the electrical line 786. For instance, when the actual second pulsating gas flow 768b is low, as determined in step 818, the vent valve 706 is controlled to close a certain amount to increase the flow through the outlet conduit 724, whereas, when the actual second pulsating gas flow 768b is high, the vent valve 706 is controlled to open a certain amount.

However, if the actual second pulsating gas flow 768b is inside the acceptable range, the method 800 continues to step 832. Step 832 includes the controller 774 measuring actual diameters of the gas bubbles by the sensors 794 via the sensor lines 790. If the diameter of the gas bubbles are within the acceptable range, as determined in step 802, the method 800 returns to step 810 without further changes to the system 710. However, if the diameter of the gas bubbles are not within the acceptable range, the method 800 proceeds to step 840 where the desired steady and pulsing flow rates are adjusted to produce a diameter of the gas bubbles within the acceptable range. For instance, various desired steady and pulsing flow rates used to obtain a desired bubble characteristic may be stored in the controller 774. In some instances, the bubble characteristics, as well as the current steady flow rate and pulsing flow rate as determined in step 810, may be used as an index into a table stored on the controller 774, which outputs desired steady and pulsing flow rates to be used to obtain the desired bubble characteristics. In other words, the current flow rate measurements and desired bubble characteristic are mapped to particular desired steady and pulsating flow rates previously stored in a data table, which may be populated based on experimental data. After the controller 774 adjusts the control valve 767 and/or vent valve 706 in step 840, the method 800 returns to step 810.

The steps of the method 800 are illustrated in a particular sequential order in FIG. 16. However, in some embodiments, one or more steps are carried out simultaneously or partially simultaneously, and one or more steps are carried out in a different order than shown. For instance, steps 832, 836, and 840 may be performed before steps 818, 824, 818, and 828, in some embodiments. Additionally, in some instances, after an adjustment (e.g., in steps 824, 828, or 840), the method may return to step 810, rather than proceeding through the other steps of method 800, and a delay may be implemented to allow time for an adjustment to be made and resulting changes detected before a further adjustment is decided upon via the method 800.

Although the wave inducer 718 is described as having wave inducer 718a and 718b, in some embodiments, the wave inducer 718 includes the wave inducer 718a without the wave inducer 718b, or includes the wave inducer 718b without the wave inducer 718a. In other words, the wave inducer 718 may be a single wave inducer, rather than a two-stage wave inducer. The single wave inducer 718 may be one of the other wave inducers described herein, such as wave inducer 18, 118, 218, 318, 418, 518, and 618b.

In embodiments of the wave inducer 718 having a motor, such as the wave inducer 618b having a motor-driven rotatory valve or motor-driven needle valve, the controller 774 is also operable to control the motor. For instance, the controller 774 includes a motor control output that provides output signals to adjust the power provided to the motor (e.g., motor 652), thereby adjusting the speed of the motor. As the motor controls the rate of oscillation of the needle valve and the rotation rate of the fluctuating member 664, adjusting the speed of the motor allows adjustment to the outgoing pulsating gas flow 768b.

The controller 774 is, for instance, a microcontroller including a processor, a memory for storing data read and accessed by the processor, and instructions (e.g., software or firmware) executed by the processor to carry out the functionality of the controller 774 described herein. In other instances, instead of or in addition to the processor and memory, the controller 774 includes an application specific integrated circuit (ASIC) or field programmable gate array (FPGA) designed or programmed to carry out the functionality described herein. In other words, the controller 774 is made up of software/firmware, hardware, or a combination thereof.

Although the embodiments of the above described microbubble generation systems are utilized as a flotation technique to extract impurities within a liquid (e.g., wastewater), the microbubble generation systems may be utilized within different applications. For example, the small bubbles (e.g., 70, 570, 670) may be used in an aeration system to mix, dissolve and/or circulate air within a liquid or other substance. In addition, the small bubbles may be used in chemical sparging to bubble an inert gas (i.e., nitrogen, argon, helium, etc.) through a liquid. Chemical sparging may be used, for example, to remove dissolved gases from a liquid (e.g., stripping of ammonia). Furthermore, the small bubbles may be used in separation of valuable components from aqueous mediums (e.g., pharmaceutical compound enrichment, mineral ore enrichment, and the like). The microbubble generation systems may be also utilized in separation of microbiological organisms (e.g., cells, algae, etc.).

Although the invention has been described in detail with reference to certain preferred embodiments, variations and modifications exist within the scope and spirit of one or more independent aspects of the invention as described.

The invention claimed is:

1. A bubble generation system comprising:
   a gaseous pressure source supplying a gas flow;
   a wave inducer including a first inlet in fluid communication with the gaseous pressure source to receive the gas flow and a first outlet, the wave inducer transitions the gas flow into a pulsating acoustic wave that exits the wave inducer through the first outlet, wherein the gas flow from the first inlet is a non-diverging gas flow that exits through the first outlet as the pulsating acoustic wave;
   a diffuser fluidly coupled to the first outlet of the wave inducer, the diffuser configured to produce bubbles from the pulsating acoustic wave; and
   a vent passageway fluidly coupled between the wave inducer and the diffuser, the vent passageway configured to be in fluid communication with an ambient environment.

2. The bubble generation system of claim 1, wherein the wave inducer defines a first wave inducer and a second wave inducer, the first wave inducer defining the first inlet and a second outlet and the second wave inducer defining a second inlet and the first outlet, wherein the second outlet of the first wave inducer is fluidly coupled to the second inlet of the second wave inducer.

3. The bubble generation system of claim 2, wherein the second wave inducer increases a frequency of the pulsating acoustic wave from the first wave inducer.

4. The bubble generation system of claim 2, wherein the first wave inducer is a valve controllable by an electrical solenoid.

5. The bubble generation system of claim 2, wherein the first wave inducer is a rotary valve defining a passageway fluidly coupling the second inlet and the first outlet, wherein the rotary valve includes a fluctuating member rotatable about a central axis having an aperture periodically in fluid communication with the passageway of the second wave inducer.

6. The bubble generation system of claim 5, wherein when the fluctuating member rotates about the central axis, the fluctuating member interrupts the pulsating acoustic wave passing through the passageway of the second wave inducer.

7. The bubble generation system of claim 5, wherein the fluctuating member operably rotates by the pulsating gas flow passing through the rotary valve.

8. The bubble generation system of claim 5, wherein the rotary valve has a rotational drive shaft coupled to and driven by a motor.

9. The bubble generation system of claim 1, further comprising an outlet flow valve fluidly coupled to the vent passageway, wherein the outlet flow valve is configured to control airflow through the vent passageway to the ambient environment.

10. The bubble generation system of claim 9, further comprising an inlet flow valve fluidly coupled between the gaseous pressure source and the wave inducer, wherein the inlet flow valve is configured to control airflow into the wave inducer.

11. The bubble generation system of claim 10, further comprising a controller coupled to at least one of the diffuser, the outlet flow valve, and the inlet flow valve.

12. The bubble generation system of claim 11, wherein an optical sensor is coupled to the diffuser, and wherein the controller monitors the bubbles by the optical sensor.

13. The bubble generation system of claim 12, wherein the controller regulates at least one of a flow rate through the outlet flow valve and a flow rate through the inlet flow valve dependent upon a size of the bubbles.

14. The bubble generation system of claim 1, further comprising a plurality of diffusers coupled to the wave inducer.

15. A method of generating microbubbles in an air flotation system comprising:
   coupling a first wave inducer fluidly between a gaseous pressure source and a diffuser;
   receiving a supply of gas flow from the gaseous pressure source at an inlet of the wave inducer;
   transitioning the gas flow into a pulsating gas flow;
   discharging the pulsating gas flow through an outlet of the wave inducer, wherein the gas flow from the inlet is a non-diverging gas flow that exits through the outlet as the pulsating acoustic wave;
   discharging a portion of the pulsating gas flow to an ambient environment;
   receiving the pulsating gas flow by the diffuser; and
   generating microbubbles from the pulsating gas flow through the diffuser.

16. The method of claim 15, further comprising controlling a size of the microbubbles by controlling at least one of the gaseous pressure source and the pulsating gas flow by at least one valve.

17. The method of claim 16, wherein controlling the size of the microbubbles further comprises a controller in communication with a sensor monitoring at least one selected from the group of the gaseous pressure source, the pulsating gas flow, and the diffuser.

18. The method of claim 16, wherein controlling the size of the microbubbles further comprises monitoring the microbubbles by an optical sensor coupled to the diffuser.

19. The method of claim 15, wherein transitioning the gas flow into the pulsating gas flow further comprises increasing a frequency of the pulsating gas flow by a second wave inducer.

20. The method of claim 19, wherein increasing the frequency of the pulsating gas flow by the second wave inducer further comprises coupling a valve controllable by an electrical solenoid or a rotary valve upstream from the second wave inducer.

* * * * *